(12) United States Patent
Toriumi et al.

(10) Patent No.: US 7,199,779 B2
(45) Date of Patent: Apr. 3, 2007

(54) DISPLAY DRIVER AND ELECTRO-OPTICAL DEVICE

(75) Inventors: Yuichi Toriumi, Chino (JP); Akira Morita, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 507 days.

(21) Appl. No.: 10/790,869

(22) Filed: Mar. 3, 2004

(65) Prior Publication Data

US 2004/0239659 A1 Dec. 2, 2004

(30) Foreign Application Priority Data

Mar. 12, 2003 (JP) ............................. 2003-066965

(51) Int. Cl.
*G09G 3/36* (2006.01)
(52) U.S. Cl. .................. 345/100; 345/87; 345/89; 345/98; 345/204; 345/589; 345/690
(58) Field of Classification Search .......... 345/87–100, 345/204–206, 589, 690
See application file for complete search history.

(56) References Cited

U.S. PATENT DOCUMENTS 6,333,730 B1 * 12/2001 Lee ........................... 345/100

7,015,886 B2 * 3/2006 Matsuyama .................. 345/87

FOREIGN PATENT DOCUMENTS

JP    A 2002-156654    5/2002

OTHER PUBLICATIONS

U.S. Appl. No. 10/834,036, filed Apr. 29, 2004, Morita et al.
U.S. Appl. No. 10/833,996, filed Apr. 29, 2004, Morita et al.
U.S. Appl. No. 10/790,059, filed Mar. 2, 2004, Toriumi et al.
U.S. Appl. No. 10/792,819, filed Mar. 5, 2004, Toriumi et al.
U.S. Appl. No. 10/790,692, filed Mar. 3, 2004, Toriumi et al.
U.S. Appl. No. 10/790,806, filed Mar. 3, 2004, Toriumi et al.

* cited by examiner

*Primary Examiner*—Richard Hjerpe
*Assistant Examiner*—Jennifer T. Nguyen
(74) *Attorney, Agent, or Firm*—Oliff & Berridge, PLC

(57) ABSTRACT

A display driver driving data lines and implementing comb-tooth drive. The display driver includes: a grayscale bus to which grayscale data is supplied corresponding to the arrangement order of the data lines; first and second bidirectional shift registers which output shift outputs of which shift directions are specified by first and second shift direction control signals; first and second data latches which latch the grayscale data based on the shift outputs; and a data line driver circuit which drives the data lines based on the latch data. The first and second shift direction control signals are output by first and second shift start signal switch circuits corresponding to the content of a drive mode setting register.

22 Claims, 26 Drawing Sheets

FIG. 14

| MODE | DIR | SHL | SHL1 | SHL2 | OPERATION |
|---|---|---|---|---|---|
| L (NORMAL) | * | L | L | L | 140 FIRST  150 SECOND  ← |
| | | H | H | H | 140  150  → |
| H (COMB-TOOTH) | L (OUTER SIDE → CENTER) | * | H | L | 140  150  →  ← |
| | H (CENTER → OUTER SIDE) | * | L | H | 140  150  ←  → |

FIG. 15A NORMAL DRIVE MODE(MODE=L), SHL=H
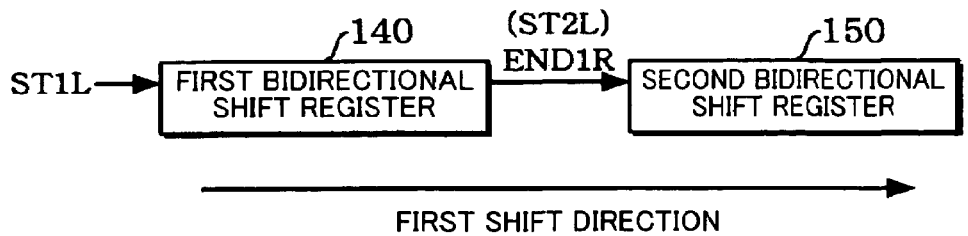
FIG. 15B NORMAL DRIVE MODE(MODE=L), SHL=H
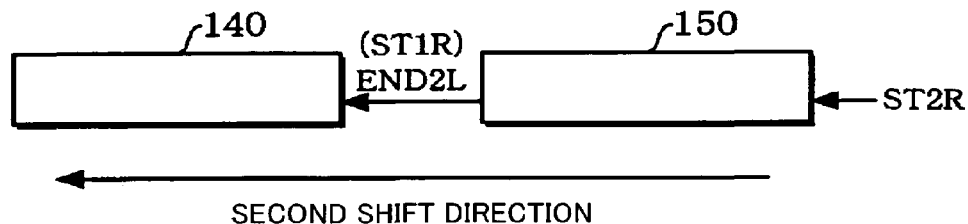
FIG. 15C COMB-TOOTH DRIVE MODE(MODE=H), DIR=L
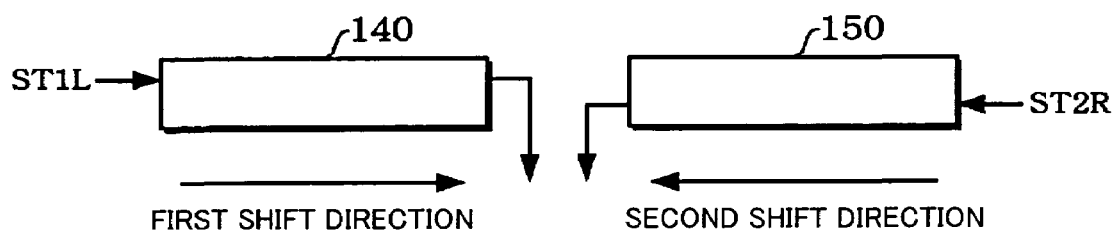
FIG. 15D COMB-TOOTH DRIVE MODE(MODE=H), DIR=L
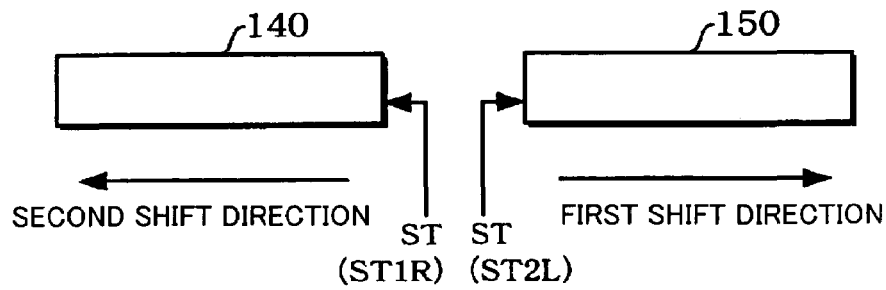

DATA CAPTURE DIRECTION

DISPLAY DRIVER AND ELECTRO-OPTICAL DEVICE

BACKGROUND OF THE INVENTION

Japanese Patent Application No. 2003-66965, filed on Mar. 12, 2003, is hereby incorporated by reference in its entirety.

The present invention relates to a display driver and an electro-optical device.

A display panel (display device in a broad sense) represented by a liquid crystal display (LCD) panel is mounted on portable telephones and personal digital assistants (PDAs). In particular, an LCD panel realizes a reduction of size, power consumption, and cost in comparison with other display panels, and is mounted on various electronic instruments.

An LCD panel is required to have a size equal to or greater than a certain size taking visibility of an image to be displayed into consideration. On the other hand, there has been a demand that the mounting area of the LCD panel be as small as possible when the LCD panel is mounted on electronic instruments.

BRIEF SUMMARY OF THE INVENTION

According to one aspect of the present invention, there is provided a display driver which drives a plurality of data lines of an electro-optical device, the electro-optical device having a plurality of scanning lines, the data lines which are alternately arranged inwardly from opposite sides of the electro-optical device in the shape of comb teeth, a plurality of switching elements respectively connected to the scanning lines and the data lines, and a plurality of pixel electrodes respectively connected to the switching elements, the display driver comprising:

a grayscale bus to which grayscale data is supplied corresponding to an arrangement order of the data lines;

a first bidirectional shift register which shifts a shift start signal in a first shift direction and shifts a first opposite directional shift start signal in a second shift direction which is opposite to the first shift direction, based on a first shift clock signal, and outputs a shift output shifted in one of the first and second shift directions specified by a first shift direction control signal;

a second bidirectional shift register which shifts the shift start signal in the second shift direction and shifts a second opposite directional shift start signal in the first shift direction, based on a second shift clock signal, and outputs a shift output shifted in one of the first and second shift directions specified by a second shift direction control signal;

a drive mode setting register in which one of a normal drive mode and a comb-tooth drive mode is set;

a first shift start signal switch circuit which outputs the shift start signal or a shift output in a final stage of the second bidirectional shift register as the first opposite directional shift start signal, corresponding to the content of the drive mode setting register, the shift output having been shifted in the second shift direction in the second bidirectional shift register;

a second shift start signal switch circuit which outputs the shift start signal or a shift output in a final stage of the first bidirectional shift register as the second opposite directional shift start signal, corresponding to the content of the drive mode setting register, the shift output having been shifted in the first shift direction in the first bidirectional shift register;

a first data latch which has a plurality of flip-flops each of which holds the grayscale data corresponding to one of the data lines based on a shift output in each stage of the first bidirectional shift register;

a second data latch which has a plurality of flip-flops each of which holds the grayscale data corresponding to one of the data lines based on a shift output in each stage of the second bidirectional shift register; and a data line driver circuit in which a plurality of data output sections are arranged corresponding to the arrangement order of the data lines, each of the data output sections driving one of the data lines based on the grayscale data held in one of the flip-flops of the first or second data latch.

BRIEF DESCRIPTION OF THE SEVERAL VIEWS OF THE DRAWING

FIG. 14 is a truth table of the shift direction control circuit of FIG. 13.

FIGS. 15A, 15B, 15C, and 15D are diagrams schematically showing shift directions of first and second bidirectional shift registers set by the shift direction control circuit of FIG. 13.

DETAILED DESCRIPTION OF THE EMBODIMENTS

Embodiments of the present invention are described below. Note that the embodiments described hereunder do not in any way limit the scope of the invention defined by the claims laid out herein. Note also that all of the elements described below should not be taken as essential requirements for the present invention.

As an LCD panel which can reduce the mounting area, a so-called comb-tooth distributed LCD panel has been known.

In order to reduce the mounting area of the LCD panel, it is effective to reduce the interconnect region between the LCD panel and a scanning driver which drives scanning lines of the LCD panel, or to reduce the interconnect region between the LCD panel and a display driver which drives data lines of the LCD panel.

In the case where a display driver drives data lines of a comb-tooth distributed LCD panel from opposite sides of the LCD panel, it is necessary to change the order of grayscale data which is supplied corresponding to the arrangement order of the data lines in a conventional LCD panel.

Since a conventional display driver cannot change the order of grayscale data which is supplied corresponding to the data lines, a dedicated data scramble IC must be added when driving the comb-tooth distributed LCD panel by using a conventional display driver.

In the comb-tooth distributed LCD panel in which the order of grayscale data must be changed as described above, the method of changing the order differs depending on the orientation of an image to be displayed on the LCD panel.

Moreover, it is preferable that the display driver be applied to a conventional LCD panel and a comb-tooth distributed LCD panel.

According to the following embodiments, a display driver and an electro-optical device capable of driving both a display panel in which the data lines are comb-tooth distributed and a display panel in which the data lines are not comb-tooth distributed corresponding to the orientation of the image to be displayed can be provided.

The embodiments of the present invention are described below in detail with reference to the drawings.

1. Electro-optical Device

Figure 1:
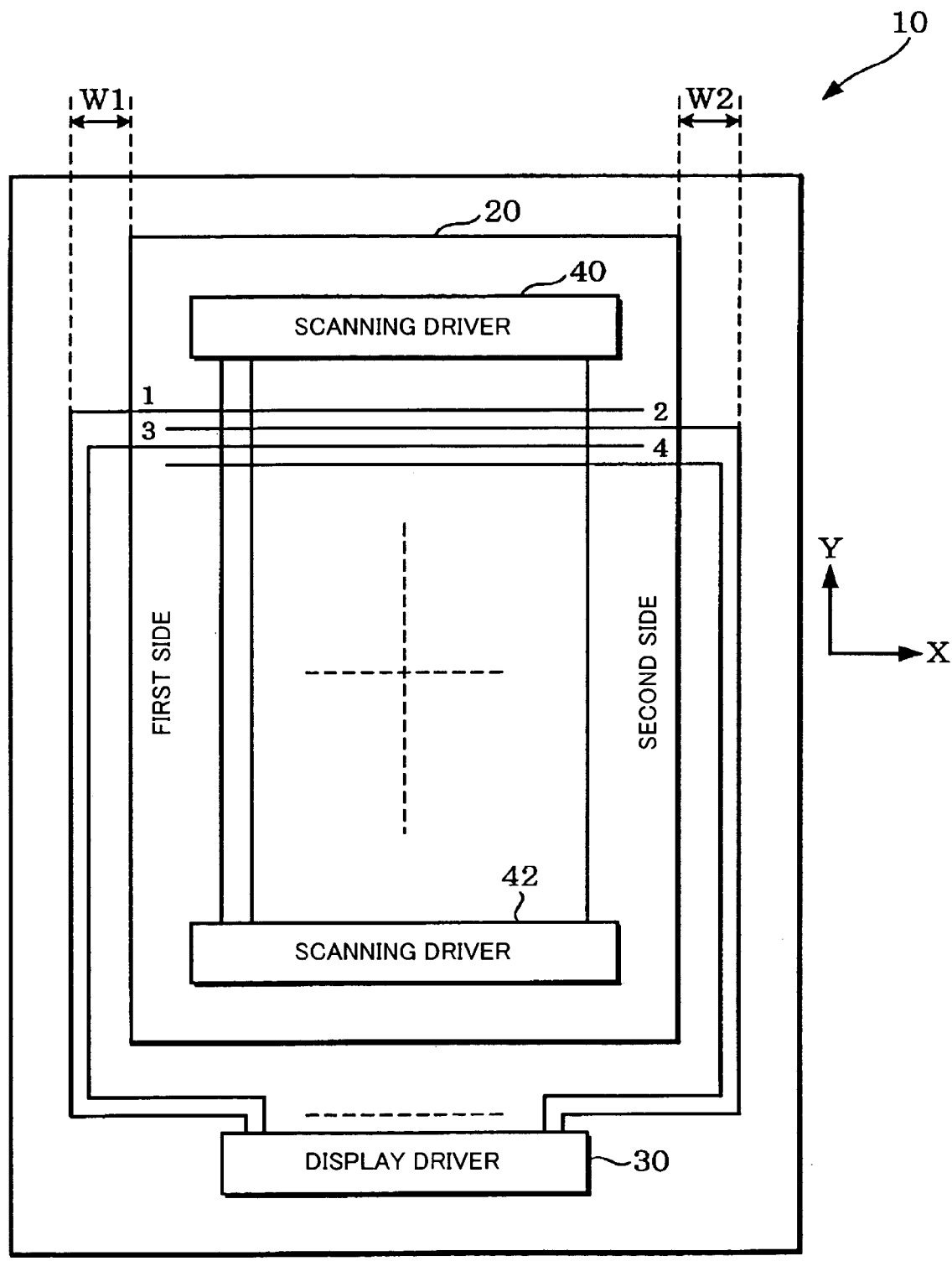
FIG. 1 is a block diagram schematically showing an electro-optical device according to one embodiment of the present invention.

FIG. 1 schematically shows an electro-optical device according to one embodiment of the present invention. A liquid crystal device is shown as an example of an electro-optical device in this figure. A liquid crystal device may be incorporated in various electronic instruments such as a portable telephone, portable information instrument (PDA or the like), digital camera, projector, portable audio player, mass storage device, video camera, electronic notebook, or global positioning system (GPS).

A liquid crystal device 10 includes an LCD panel 20 (display panel in a broad sense; electro-optical device in a broader sense), a display driver 30 (source driver), and scanning drivers 40 and 42 (gate drivers).

The liquid crystal device 10 does not necessarily include all of these circuit blocks. The liquid crystal device 10 may have a configuration in which some of these circuit blocks are omitted.

The LCD panel 20 includes a plurality of scanning lines (gate lines), a plurality of data lines (source lines) which intersect the scanning lines, and a plurality of pixels, each of the pixels being specified by one of the scanning lines and one of the data lines. In the case where one pixel consists of three color components of RGB, one pixel consists of three dots, one dot each for red, green, and blue. The dot may be referred to as an element point which makes up each pixel. The data lines corresponding to one pixel may be referred to as data lines for the number of color components which make up one pixel. The following description is appropriately given on the assumption that one pixel consists of one dot for convenience of description.

Each of the pixels includes a thin film transistor (hereinafter abbreviated as "TFT") (switching element) and a pixel electrode. The TFT is connected with the data line, and the pixel electrode is connected with the TFT.

The LCD panel 20 is formed on a panel substrate such as a glass substrate. A plurality of scanning lines, arranged in the X direction shown in FIG. 1 and extending in the Y direction, and a plurality of data lines, arranged in the Y direction and extending in the X direction, are disposed on the panel substrate. In the LCD panel 20, the data lines are comb-tooth distributed. In FIG. 1, the data lines are comb-tooth distributed so as to be driven from a first side of the LCD panel 20 and a second side which faces the first side. The comb-tooth distribution may be referred to as a distribution in which a given number of data lines (one or a plurality of data lines) are alternately distributed from opposite sides (first and second sides of the LCD panel 20) toward the inside of the LCD panel 20 in the shape of comb teeth.

Figure 2:
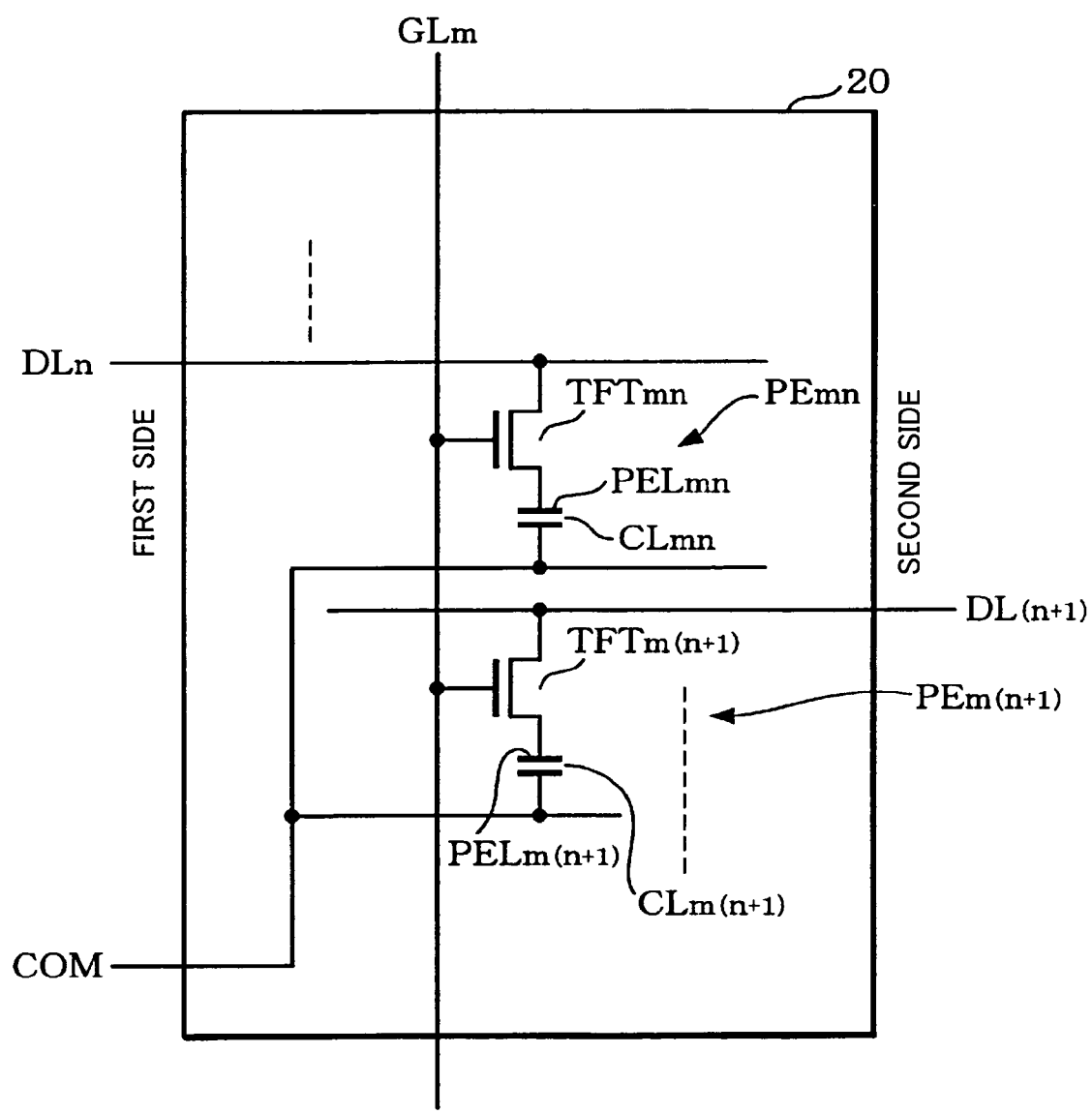
FIG. 2 is a diagram schematically showing a pixel according to one embodiment of the present invention.

FIG. 2 schematically shows a configuration of the pixel. In FIG. 2, one pixel consists of one dot. A pixel PEmn is disposed at a position corresponding to the intersecting point of the scanning line GLm ($1 \leq m \leq M$, M and m are integers) and the data line DLn ($1 \leq n \leq N$, N and n are integers). The pixel PEmn includes the TFTmn and the pixel electrode PELmn.

A gate electrode of the TFTmn is connected with the scanning line GLm. A source electrode of the TFTmn is connected with the data line DLn. A drain electrode of the TFTmn is connected with the pixel electrode PELmn. A liquid crystal capacitor CLmn is formed between the pixel electrode and a common electrode COM which faces the pixel electrode through a liquid crystal element (electro-optical material in a broad sense). A storage capacitor may be formed in parallel with the liquid crystal capacitor CLmn. Transmissivity of the pixel changes corresponding to the voltage applied between the pixel electrode and the common electrode COM. A voltage VCOM supplied to the common electrode COM is generated by a power supply circuit (not shown).

The LCD panel 20 is formed by attaching a first substrate on which the pixel electrode and the TFT are formed to a second substrate on which the common electrode is formed, and sealing a liquid crystal as an electro-optical material between the two substrates.

The scanning line is scanned by the scanning drivers 40 and 42. In FIG. 1, one scanning line is driven by the scanning drivers 40 and 42 at the same time.

The data line is driven by the display driver 30. The data line is driven by the display driver 30 from the first side of the LCD panel 20 or the second side of the LCD panel 20 which faces the first side. The first and second sides of the LCD panel 20 face in the direction in which the data lines extend.

In the comb-tooth distributed LCD panel 20, the data lines are provided corresponding to the pixels and driven inwardly from opposite sides, each of the pixels is connected to corresponding one of the scanning lines, and the number of the data lines for one pixel is equal to the number of color components of each pixel.

In FIG. 2, in the LCD panel 20 in which the data lines are comb-tooth distributed, in the case where the data lines DLn and DL(n+1) are disposed corresponding to the adjacent pixels connected with the selected scanning line GLm, the data line DLn is driven by the display driver 30 from the first side of the LCD panel 20, and the data line DL(n+1) is driven by the display driver 30 from the second side of the LCD panel 20.

The above description also applies to the case where the data lines corresponding to the RGB color components are disposed corresponding to one pixel. In this case, if the data line DLn consisting of a set of three color component data lines (Rn, Gn, Bn) and the data line DL(n+1) consisting of a set of three color component data lines (R(n+1), G(n+1), B(n+1)) are disposed corresponding to the adjacent pixels connected with the selected scanning line GLm, the data line DLn is driven by the display driver 30 from the first side of the LCD panel 20, and the data line DL(n+1) is driven by the display driver 30 from the second side of the LCD panel 20.

The display driver 30 drives the data lines DL1 to DLN of the LCD panel 20 based on grayscale data for one horizontal scanning period supplied in units of horizontal scanning periods. In more detail, the display driver 30 is capable of driving at least one of the data lines DL1 to DLN based on the grayscale data.

The scanning drivers 40 and 42 scan the scanning lines GL1 to GLM of the LCD panel 20. In more detail, the scanning drivers 40 and 42 consecutively select the scanning lines GL1 to GLM within one vertical scanning period, and drive the selected scanning line.

The display driver 30 and the scanning drivers 40 and 42 are controlled by using a controller (not shown). The controller outputs control signals to the display driver 30, the scanning drivers 40 and 42, and the power supply circuit according to the contents set by a host such as a central processing unit (CPU). In more detail, the controller supplies an operation mode setting and a horizontal synchronization signal or a vertical synchronization signal generated therein to the display driver 30 and the scanning drivers 40 and 42, for example. The horizontal synchronization signal specifies the horizontal scanning period. The vertical synchronization signal specifies the vertical scanning period. The controller controls the power supply circuit relating to polarity reversal timing of the voltage VCOM applied to the common electrode COM.

The power supply circuit generates various voltages applied to the LCD panel 20 and the voltage VCOM applied to the common electrode COM based on a reference voltage supplied from the outside.

In FIG. 1, the liquid crystal device 10 may include the controller, or the controller may be provided outside the liquid crystal device 10. The host (not shown) may be included in the liquid crystal device 10 together with the controller.

At least one of the scanning drivers 40 and 42, the controller, and the power supply circuit may be included in the display driver 30.

Some or all of the display driver 30, the scanning drivers 40 and 42, the controller, and the power supply circuit may be formed on the LCD panel 20. For example, the display driver 30 and the scanning drivers 40 and 42 may be formed on the LCD panel 20. In this case, the LCD panel 20 may be called an electro-optical device. The LCD panel 20 may be formed to include the data lines, the scanning lines, the pixels, each of which is specified by one of the data lines and one of the scanning lines, the display driver which drives the data lines, and the scanning drivers which scan the scanning lines. The pixels are formed in a pixel formation region of the LCD panel 20.

The advantages of the comb-tooth distributed LCD panel are described below.

Figure 3:
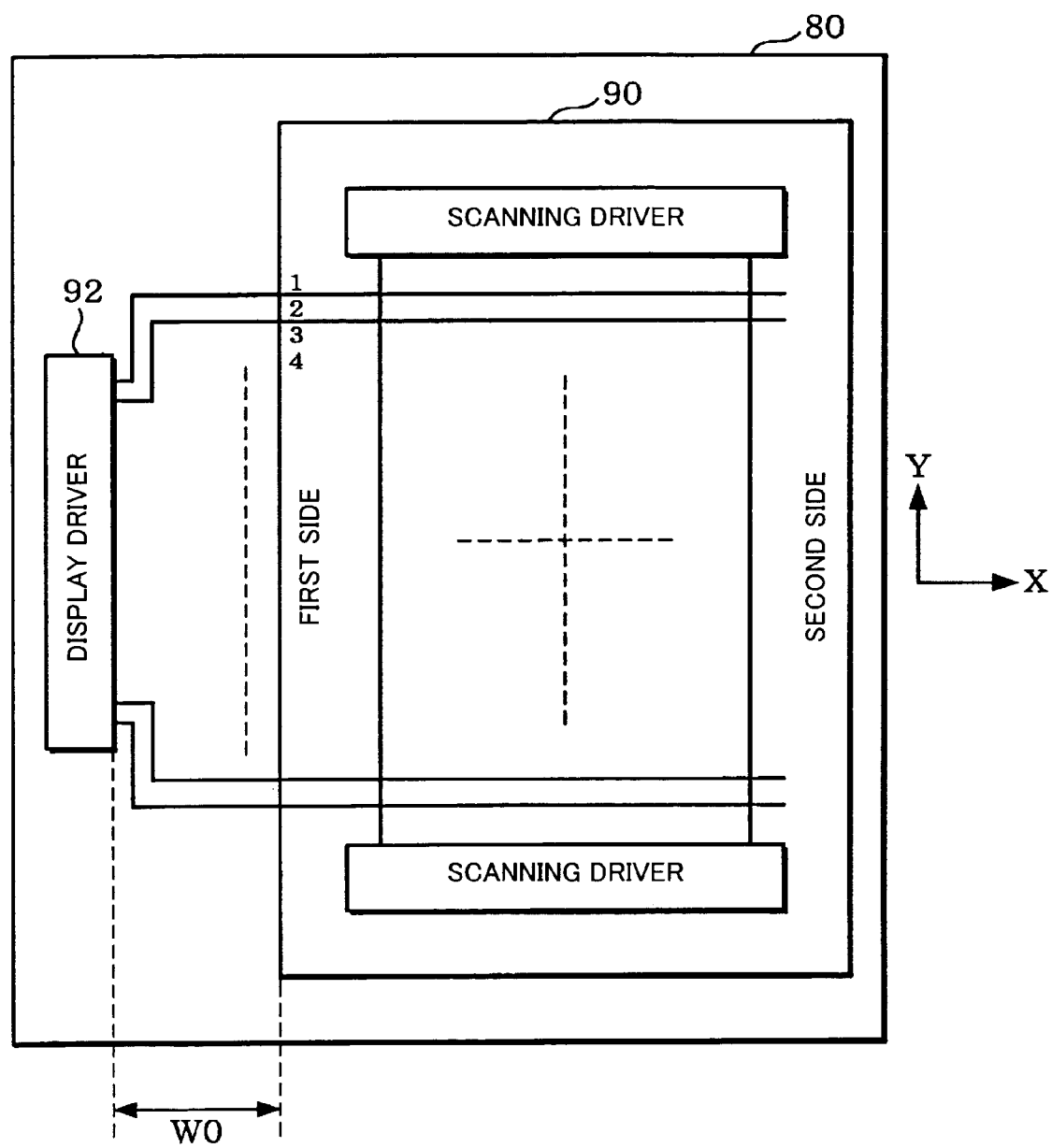
FIG. 3 is a block diagram schematically showing an electro-optical device including an LCD panel which is not comb-tooth distributed.

FIG. 3 schematically shows a configuration of an electro-optical device including an LCD panel which is not comb-tooth distributed. An electro-optical device 80 shown in FIG. 3 includes an LCD panel 90 which is not comb-tooth distributed. In the LCD panel 90, the data lines are driven by a display driver 92 from the first side. Therefore, an interconnect region for connecting the data output sections of the display driver 92 with the data lines of the LCD panel 90 is necessary. If the number of data lines is increased and the lengths of the first and second sides of the LCD panel 90 are increased, it is necessary to bend each interconnect, whereby a width W0 is necessary for the interconnect region.

On the contrary, in the electro-optical device 10 shown in FIG. 1, only widths W1 and W2 which are smaller than the width W0 are respectively necessary on the first and second sides of the LCD panel 20.

Taking mounting on electronic instruments into consideration, it is disadvantageous that the length of the LCD panel (electro-optical device) is increased in the direction of the short side in comparison with the case where the length of the LCD panel is increased in the direction of the long side to some extent. This is undesirable from the viewpoint of the design, since the width of the frame of the display section of the electronic instrument is increased, for example.

In FIG. 3, the length of the LCD panel is increased in the direction of the short side. In FIG. 1, the length of the LCD panel is increased in the direction of the long side. Therefore, the widths of the interconnect regions on the first and second sides can be made narrow to almost an equal extent. In FIG. 1, the area of the non-interconnect region in FIG. 3 can be reduced, whereby the mounting area can be reduced.

Figure 4:
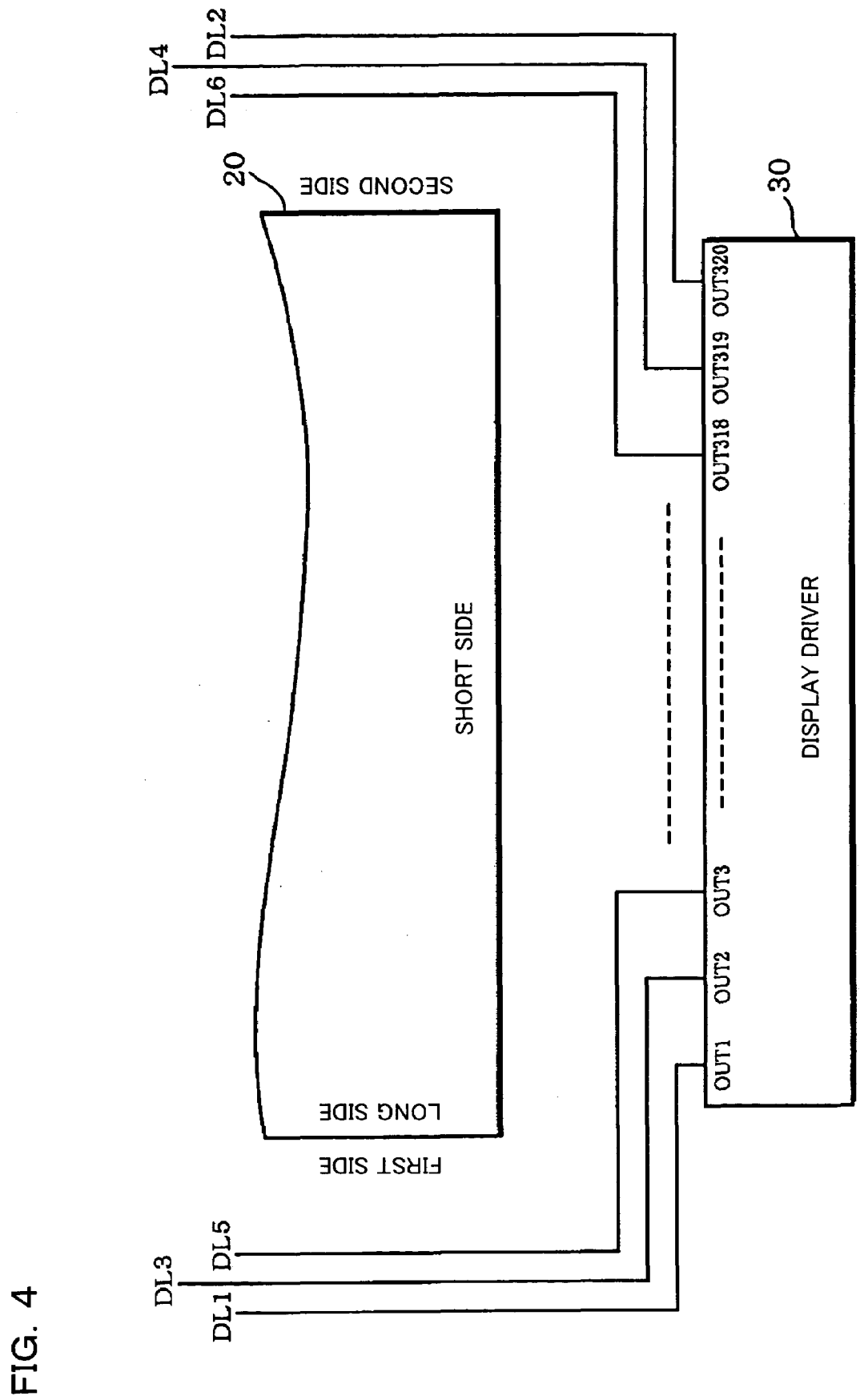
FIG. 4 is a diagram showing a display driver disposed along the short side of an LCD panel according to one embodiment of the present invention.

In the case where the arrangement order of the data output sections of the display driver 30 corresponds to the arrangement order of the data lines of the LCD panel 20, interconnects which connect the data output sections with the data lines can be disposed from the first and second sides by disposing the display driver 30 along the short side of the LCD panel 20 as shown in FIG. 4, whereby the interconnects can be simplified and the area of the interconnect region can be reduced.

However, in the display driver 30 which receives the grayscale data output corresponding to the arrangement order of the data lines by using a general-purpose controller, it is necessary to change the order of received grayscale data when driving the LCD panel 20.

The following description is given on the assumption that the display driver 30 includes data output sections OUT1 to OUT320, and the data output sections are arranged in the direction from the first side to the second side. The data output sections correspond to the data lines of the LCD panel 20.

Figure 5:
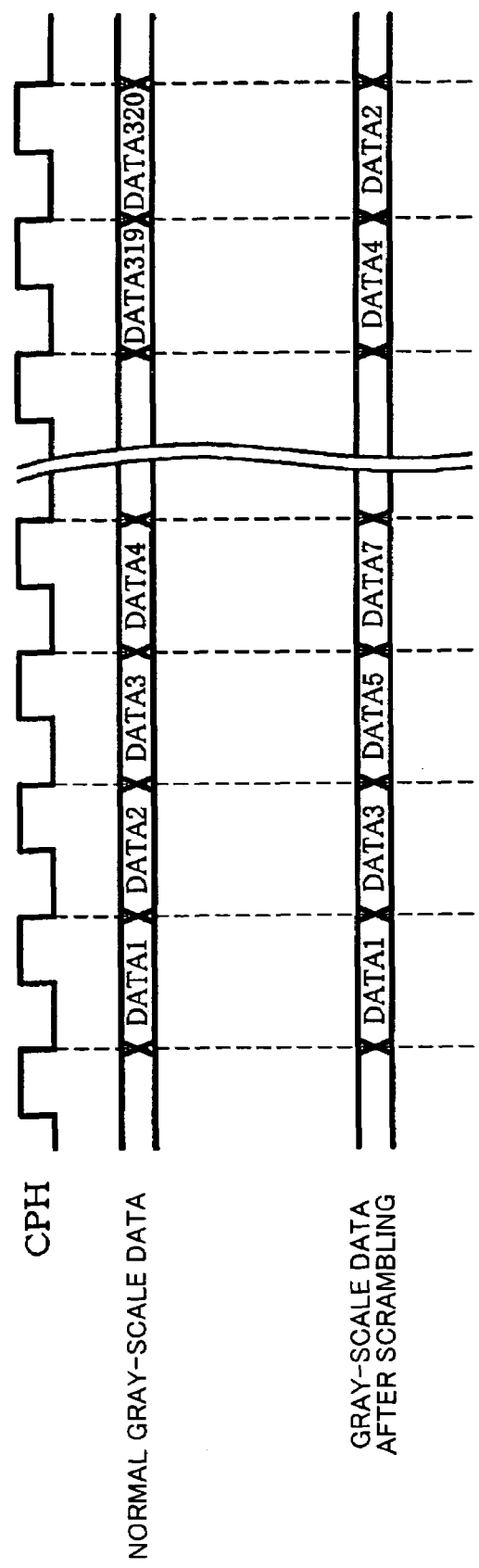
FIG. 5 is a diagram illustrative of data scrambling for driving a comb-tooth distributed LCD panel according to one embodiment of the present invention.

A general-purpose controller supplies grayscale data DATA1 to DATA320 respectively corresponding to the data lines DL1 to DL320 to the display driver 30 in synchronization with a reference clock signal CPH, as shown in FIG. 5. In the case where the display driver 30 drives the LCD panel which is not comb-tooth distributed as shown in FIG. 3, since the data output section OUT1 is connected with the data line DL1, the data output section OUT2 is connected with the data line DL2, . . . , and the data output section OUT320 is connected with the data line DL320, an image can be displayed without causing a problem. However, in the case where the display driver 30 drives the comb-tooth distributed LCD panel as shown in FIG. 1 or 4, since the data output section OUT1 is connected with the data line DL1, the data output section OUT2 is connected with the data line DL3, . . . , and the data output section OUT320 is connected with the data line DL2, a desired image cannot be displayed.

Therefore, it is necessary to change the arrangement of the grayscale data as shown in FIG. 5 by performing scramble processing which changes the order of the grayscale data. Therefore, in the case of driving the comb-tooth distributed LCD panel by using a display driver controlled by a general-purpose controller, a dedicated data scramble IC which performs the above scramble processing is added, whereby the mounting area is inevitably increased.

The display driver 30 in this embodiment is capable of driving the comb-tooth distributed LCD panel based on the grayscale data supplied from a general-purpose controller by using the configuration described below.

In the case of driving the data lines of the comb-tooth distributed LCD panel 20 by using the display driver 30, the arrangement order of the grayscale data must be changed corresponding to the orientation of the image to be displayed.

Figure 6A:
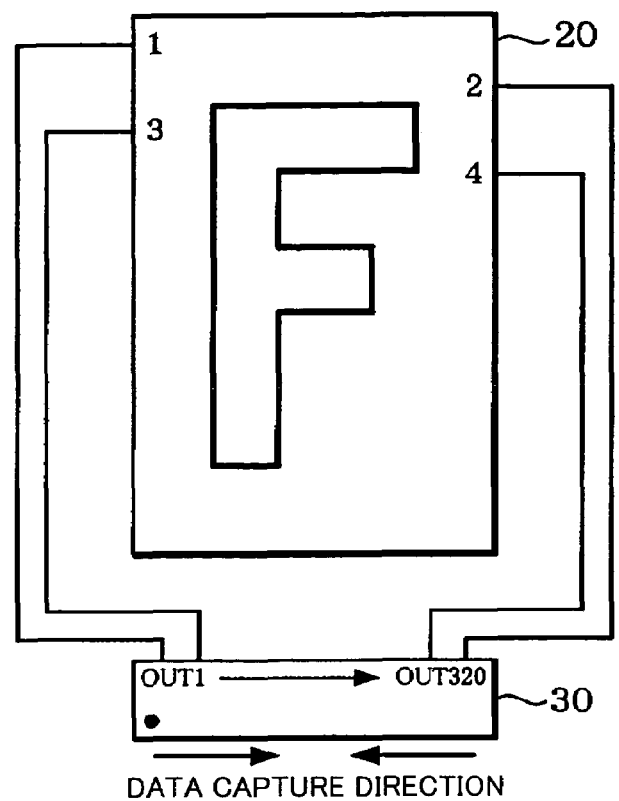
FIG. 6A is a diagram schematically showing a first distribution state of a display driver for an LCD panel according to one embodiment of the present invention.
Figure 6B:
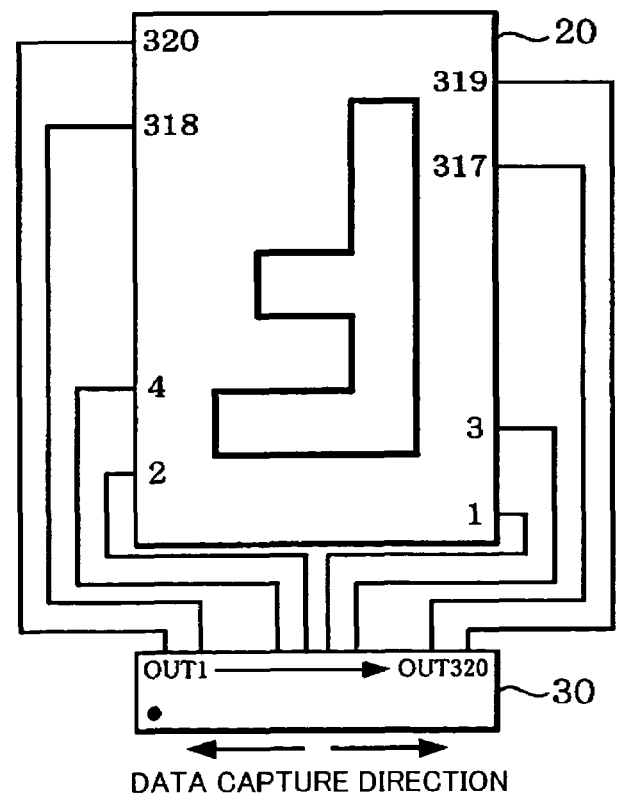
FIG. 6B is a diagram schematically showing a second distribution state of a display driver for the LCD panel.

FIG. 6A is a diagram schematically showing a first distribution state (or a first mounting state) of the display driver 30 for the LCD panel 20; and FIG. 6B is a diagram schematically showing a second distribution state (or a second mounting state) of the display driver 30 for the LCD panel 20.

In this example, the display driver 30 is capable of changing the arrangement order of the grayscale data in order to display the image shown in FIG. 6A. Therefore, the display driver 30 captures the grayscale data DATA1, DATA2, DATA3, . . . in the order of the data output section OUT1, the data output section OUT 320, and the data output section OUT 3, . . . , as shown in FIG. 5 (the first distribution state).

However, if the display driver 30 captures the grayscale data in the same order in the second distribution state, since the drive voltage based on the grayscale data DATA1 is output from the data output section OUT1, the image shown in FIG. 6B cannot be displayed.

As described above, the arrangement order of the grayscale data and the capture direction of the grayscale data have to be changed depending on the orientation of the image to be displayed on the LCD panel 20, even if the display driver 30 is in the same distribution state relative to the LCD panel 20.

2. Display Driver

Figure 7:
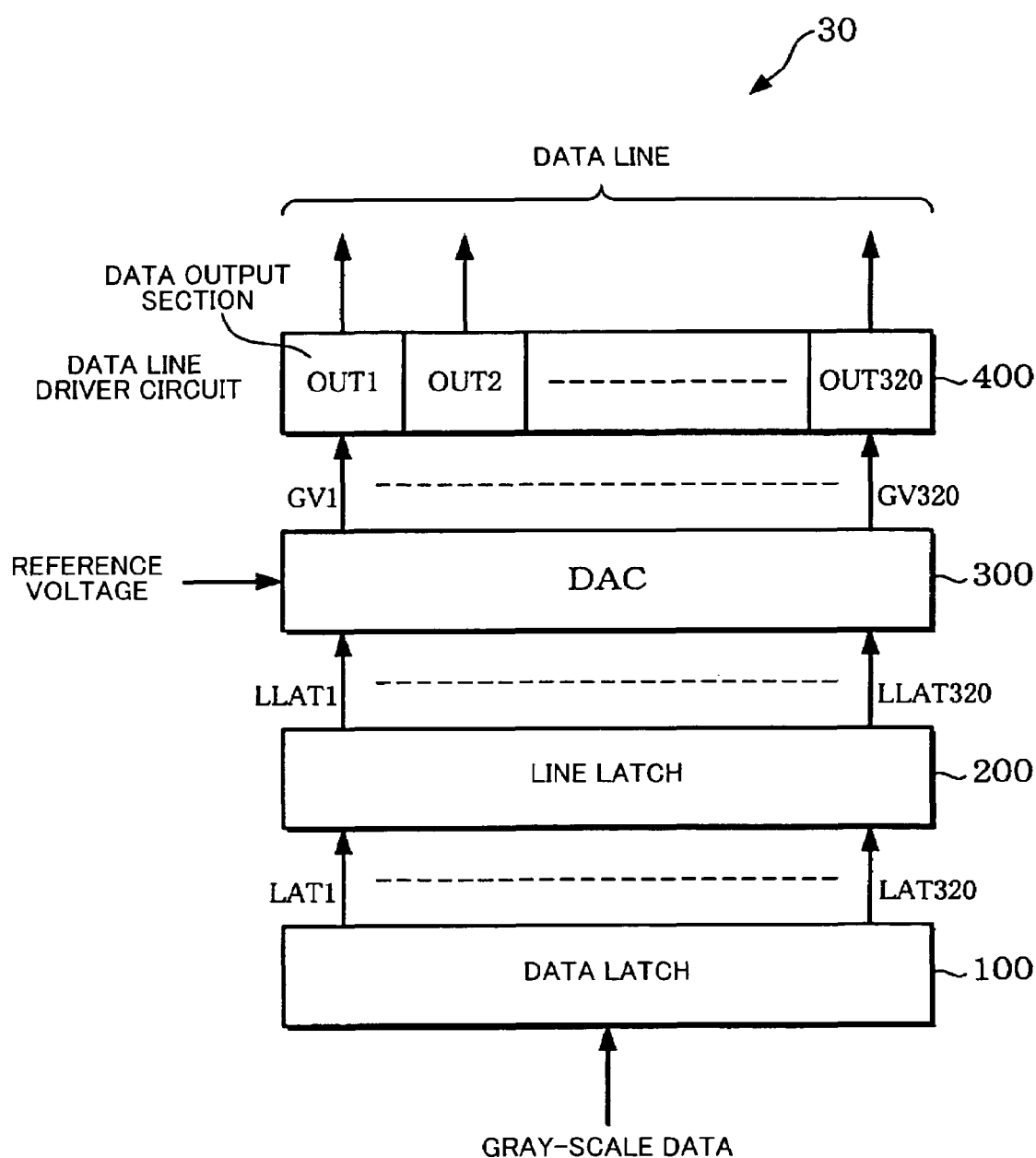
FIG. 7 is a block diagram schematically showing a display driver according to one embodiment of the present invention.

FIG. 7 shows an outline of a configuration of the display driver 30. The display driver 30 includes a data latch 100, a line latch 200, a digital-to-analog converter (DAC) 300 (voltage select circuit in a broad sense), and a data line driver circuit 400.

The data latch 100 captures the grayscale data in one horizontal scanning cycle.

The line latch 200 latches the grayscale data captured by the data latch 100 based on a horizontal synchronization signal Hsync.

The DAC 300 selectively outputs the drive voltage (grayscale voltage) corresponding to the grayscale data output from the line latch 200 in units of data lines from a plurality of reference voltages corresponding to the grayscale data. In more detail, the DAC 300 decodes the grayscale data output from the line latch 200, and selects one of the reference voltages based on the decoded result. The reference voltage selected by the DAC 300 is output to the data line driver circuit 400 as the drive voltage.

The data line driver circuit 400 includes 320 data output sections OUT1 to OUT320. The data line driver circuit 400 drives the data lines DL to DLN based on the drive voltage output from the DAC 300 through the data output sections OUT1 to OUT320. In the data line driver circuit 400, the data output sections (OUT1 to OUT320), each of which drives the data line based on the grayscale data (latch data) held in the line latch 200 (flip-flop of the first or second data latch), are disposed corresponding to the arrangement order of the data lines. The above description illustrates the case where the data line driver circuit 400 includes 320 data output sections OUT1 to OUT320. However, the number of data output sections is not limited thereto.

In the display driver 30, the latch data LAT1 captured by the data latch 100 is output to the line latch 200. The latch data LLAT1 latched by the line latch 200 is output to the DAC 300. The DAC 300 generates a drive voltage GV1 corresponding to the latch data LLAT1 output from the line latch 200. The data output section OUT1 of the data line driver circuit 400 drives the data line connected with the data output section OUT1 based on the drive voltage GV1 output from the DAC 300.

As described above, the display driver 30 captures the grayscale data in the data latch 100 in units of data output sections of the data line driver circuit 400. The latch data latched by the data latch 100 in units of data output sections may be in units of one pixel, in units of a plurality of pixels, in units of one dot, or in units of a plurality of dots.

Figure 8:
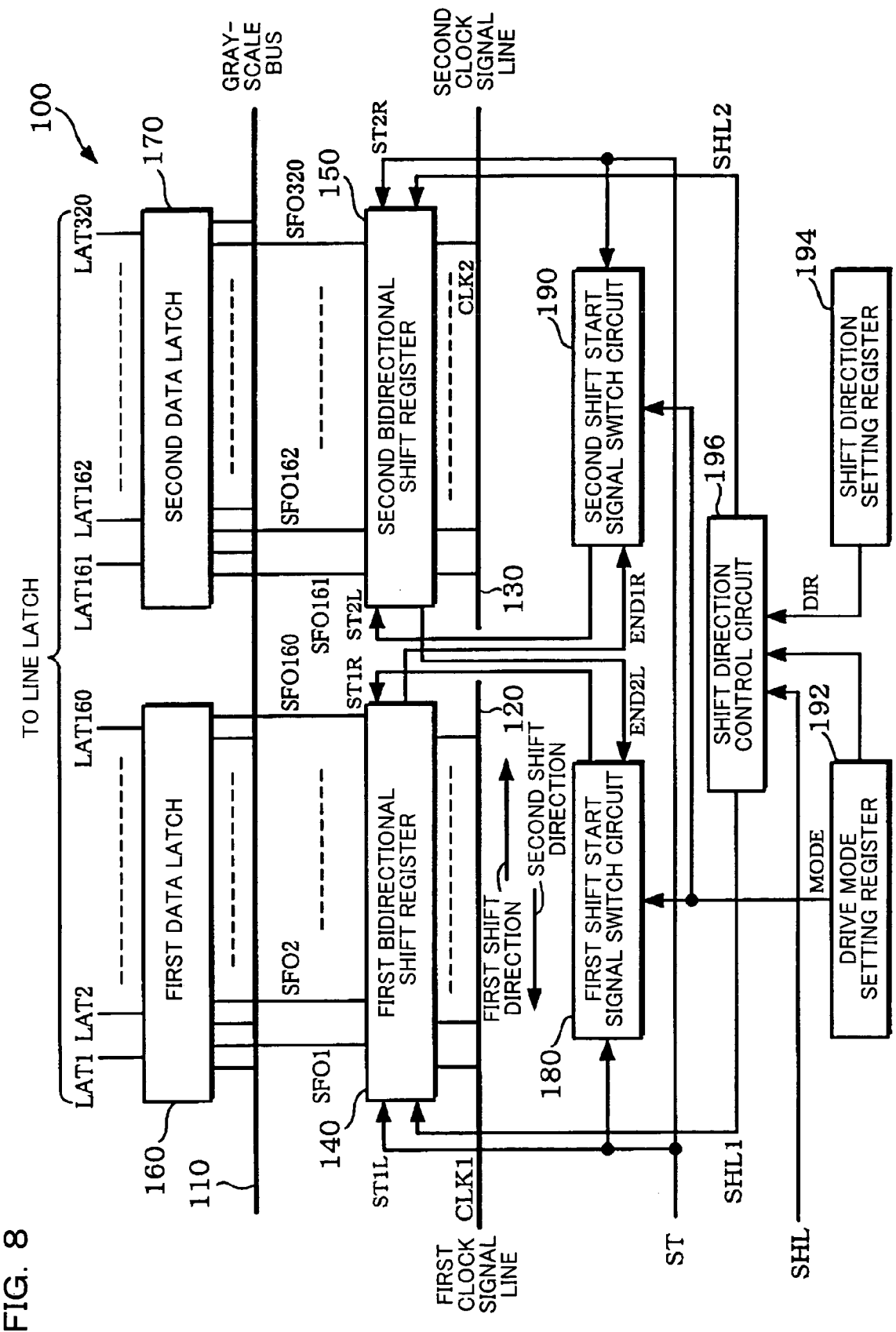
FIG. 8 is a block diagram schematically showing the data latch of FIG. 7.

FIG. 8 shows an outline of the configuration of the data latch 100 shown in FIG. 7. The data latch 100 includes a grayscale bus 110, first and second clock signal lines 120 and 130, first and second bidirectional shift registers 140 and 150, and first and second data latches 160 and 170. The data latch 100 includes first and second shift start signal switch circuits 180 and 190, a drive mode setting register 192, a shift direction setting register 194, and a shift direction control circuit 196.

The grayscale data is supplied to the grayscale bus 110 corresponding to the arrangement order of the data lines DL1 to DLN. A first shift clock signal CLK1 is supplied to the first clock signal line 120. A second shift clock signal CLK2 is supplied to the second clock signal line 130.

The first bidirectional shift register 140 shifts a shift start signal ST1L (ST) in a first shift direction and shifts a first opposite directional shift start signal ST1R in a second shift direction opposite to the first shift direction based on the first shift clock signal CLK1. The first shift direction may be the direction from the first side to the second side of the LCD panel 20. The first bidirectional shift register 140 outputs shift outputs shifted in either the first or second shift direction specified by a first shift direction control signal SHL1 as shift outputs SFO1 to SFO160. The shift outputs SFO1 to SFO160 are output to the first data latch 160.

Figure 9:
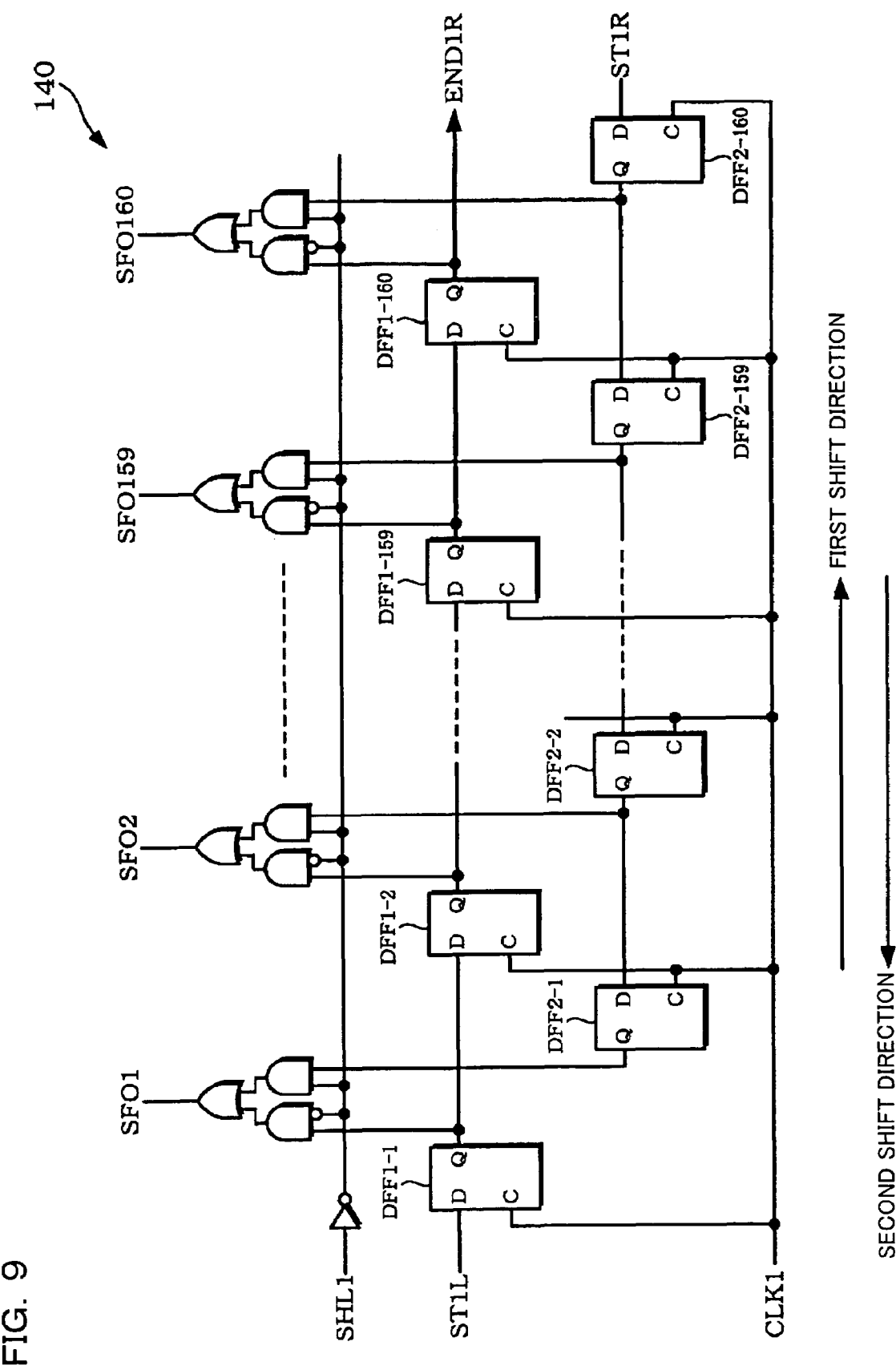
FIG. 9 is a circuit diagram showing a first bidirectional shift register according to one embodiment of the present invention.

FIG. 9 shows a configuration example of the first bidirectional shift register 140. In the first bidirectional shift register 140, D flip-flops DFF1-1 to DFF1-160 are connected in series so that a pulse of the shift start signal ST1L is shifted in the first shift direction. A Q terminal of the D flip-flop DFF1-k ($1 \leq k \leq 159$, k is a natural number) is connected with a D terminal of the D flip-flop DFF1-(k+1) in the subsequent stage. In the first bidirectional shift register 140, D flip-flops DFF2-160 to DFF2-1 are connected in series so that a pulse of the shift start signal ST1R is shifted in the second shift direction. A Q terminal of the D flip-flop DFF2-k ($2 \leq k \leq 160$, k is a natural number) is connected with a D terminal of the D flip-flop DFF2-(k−1) in the subsequent stage.

Either the shift output from the Q terminal of the D flip-flop DFF1-i ($1 \leq i \leq 160$, i is a natural number) or the shift output from the Q terminal of the D flip-flop DFF2-i is selected by the first shift direction control signal SHL1 and output as the shift output SFOi.

The shift start signal ST1L for outputting the shift output in the first shift direction is input to the D terminal of the D flip-flop DFF1-1. The first opposite directional shift start signal ST1R for outputting the shift output in the second shift direction is input to the D terminal of the D flip-flop DFF2-160.

A shift output END1R (shift finish signal) is output from the Q terminal of the D flip-flop DFF1-160.

In FIG. 8, the second bidirectional shift register 150 shifts a shift start signal ST2R (ST) in the first shift direction and shifts a second opposite directional shift start signal ST2L in the second shift direction opposite to the first shift direction based on the second shift clock signal CLK2. The second bidirectional shift register 150 outputs the shift outputs shifted in either the first or second shift direction specified by a second shift direction control signal SHL2 as shift outputs SFO161 to SFO320. The shift outputs SFO161 to SFO320 are output to the second data latch 170.

Figure 10:
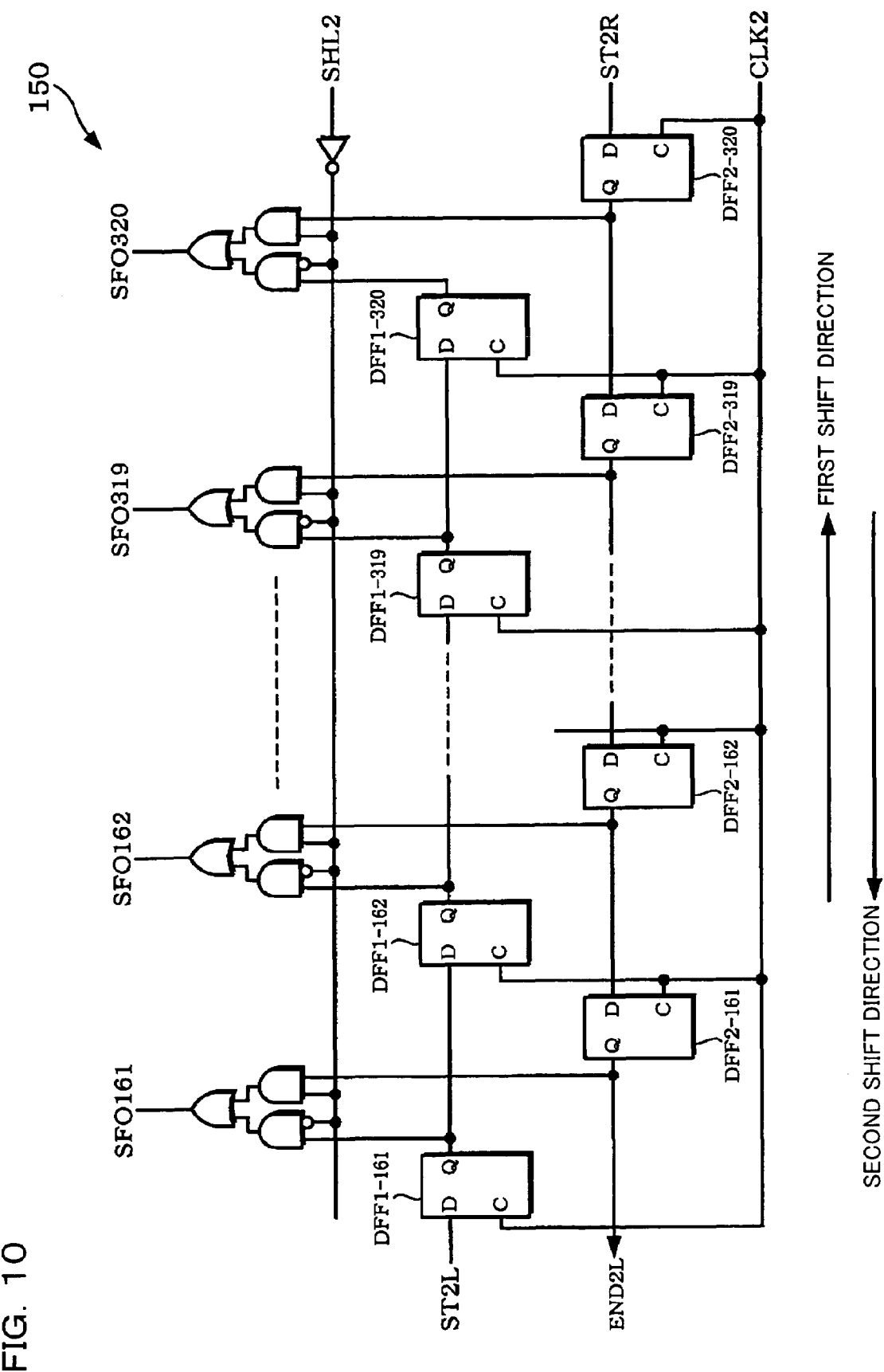
FIG. 10 is a circuit diagram showing a second bidirectional shift register according to one embodiment of the present invention.

FIG. 10 shows a configuration example of the second bidirectional shift register 150. In the second bidirectional shift register 150, D flip-flops DFF1-161 to DFF1-320 are connected in series so that a pulse of the shift start signal ST2L is shifted in the first shift direction. A Q terminal of the D flip-flop DFF1-k ($161 \leq k \leq 319$, k is a natural number) is connected with a D terminal of the D flip-flop DFF1-(k+1) in the subsequent stage. In the second bidirectional shift register 150, D flip-flops DFF2-320 to DFF2-161 are connected in series so that a pulse of the shift start signal ST2R is shifted in the second shift direction. A Q terminal of the D flip-flop DFF2-k ($162 \leq k \leq 320$, k is a natural number) is connected with a D terminal of the D flip-flop DFF2-(k−1) in the subsequent stage.

Either the shift output from the Q terminal of the D flip-flop DFF1-i ($161 \leq i \leq 320$, i is a natural number) or the shift output from the Q terminal of the D flip-flop DFF2-i is selected by the second shift direction control signal SHL2 and output as the shift output SFOi.

The second opposite directional shift start signal ST2L for outputting the shift output in the first shift direction is input to the D terminal of the D flip-flop DFF 1-161. The shift start signal ST2R (ST) for outputting the shift output in the first shift direction is input to the D terminal of the D flip-flop DFF2-320.

A shift output END2L (shift finish signal) is output from the Q terminal of the D flip-flop DFF2-161.

In FIG. 8, the first data latch 160 includes a plurality of flip-flops FF1 to FF160 (not shown) which correspond to the data output sections OUT1 to OUT160. The flip-flop FFi ($1 \leq i \leq 160$) holds the grayscale data on the grayscale bus 110 based on the shift output SFOi from the first bidirectional shift register 140. Specifically, the first data latch 160 latches the grayscale data based on the shift output in each stage of the first bidirectional shift register 140. The grayscale data held in the flip-flops of the first data latch 160 is output to the line latch 200 as the latch data LAT1 to LAT160.

The second data latch 170 includes a plurality of flip-flops FF161 to FF320 (not shown) which correspond to the data output sections OUT161 to OUT320. The lflip-flop FFi ($161 \leq i \leq 320$) holds the grayscale data on the grayscale bus 110 based on the shift output SFOi from the second bidirectional shift register 150. Specifically, the second data latch 170 latches the grayscale data based on the shift output in each stage of the second bidirectional shift register 150. The grayscale data held in the flip-flops of the second data latch 170 is output to the line latch 200 as the latch data LAT161 to LAT320.

As shown in FIG. 8, the first and second shift start signal switch circuits 180 and 190 respectively generate the first and second opposite directional shift start signals ST1R and ST2L.

The drive mode setting register 192 is a register which can be set by the host or the like. The drive mode setting register 192 is a control register for setting either a normal drive mode or a comb-tooth drive mode. In the normal drive mode, the display driver 30 can drive the data lines of the LCD panel which is not comb-tooth distributed as shown in FIG. 3. In the comb-tooth drive mode, the display driver 30 can drive the data lines of the LCD panel which is comb-tooth distributed as shown in FIG. 1.

The first and second shift start signal switch circuits 180 and 190 respectively output the first and second opposite directional shift start signals ST1R and ST2L according to the content of the drive mode setting register 192.

The shift direction setting register 194 is a register which can be set by the host or the like. The shift direction setting register 194 is a control register for setting the shift directions of the first and second bidirectional shift registers 140 and 150. The content of the shift direction setting register 194 is enabled in the comb-tooth drive mode. Specifically, in the comb-tooth drive mode, the capture order of the grayscale data on the grayscale bus 110 is changed by setting the shift directions of the first and second bidirectional shift registers 140 and 150 according to the content of the shift direction setting register 194 to change the data capture direction.

The shift direction control circuit 196 outputs the first and second shift direction control signals SHL1 and SHL2 based on the content of the drive mode setting register.

Figure 11:
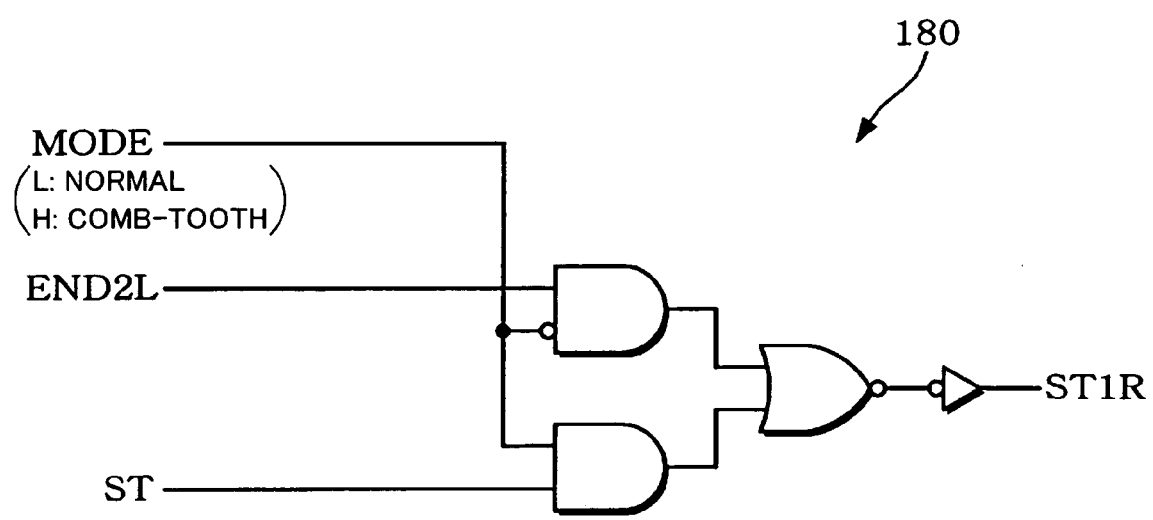
FIG. 11 is a circuit diagram showing a first shift start signal switch circuit according to one embodiment of the present invention.

FIG. 11 shows a configuration example of the first shift start signal switch circuit 180. The shift start signal ST (ST1L), the shift output END2L from the second bidirectional shift register 150, and a drive mode setting signal MODE are input to the first shift start signal switch circuit 180. The shift output END2L from the second bidirectional shift register 150 is the shift output in the final stage which has been shifted in the second direction in the second bidirectional shift register 150. The drive mode setting signal MODE is a signal which indicates whether the drive mode set in the drive mode setting register 192 is either the normal drive mode or the comb-tooth drive mode. In FIG. 11, the drive mode setting signal MODE is set at "L" (L level) during the normal drive mode and at "H" (H level) during the comb-tooth drive mode.

The first shift start signal switch circuit 180 is a selector which selectively outputs a signal based on the drive mode setting signal MODE. Specifically, the first shift start signal switch circuit 180 outputs either the shift start signal ST or the shift output END2L from the second bidirectional shift register 150 as the first opposite directional shift start signal ST1R according to the content of the drive mode setting register 192. In more detail, the first shift start signal switch circuit 180 outputs the shift output END2L from the second bidirectional shift register 150 as the first opposite directional shift start signal ST1R when the normal drive mode is set in the drive mode setting register 192. The first shift start signal switch circuit 180 outputs the shift start signal ST as the first opposite directional shift start signal ST1R when the comb-tooth drive mode is set in the drive mode setting register 192.

Figure 12:
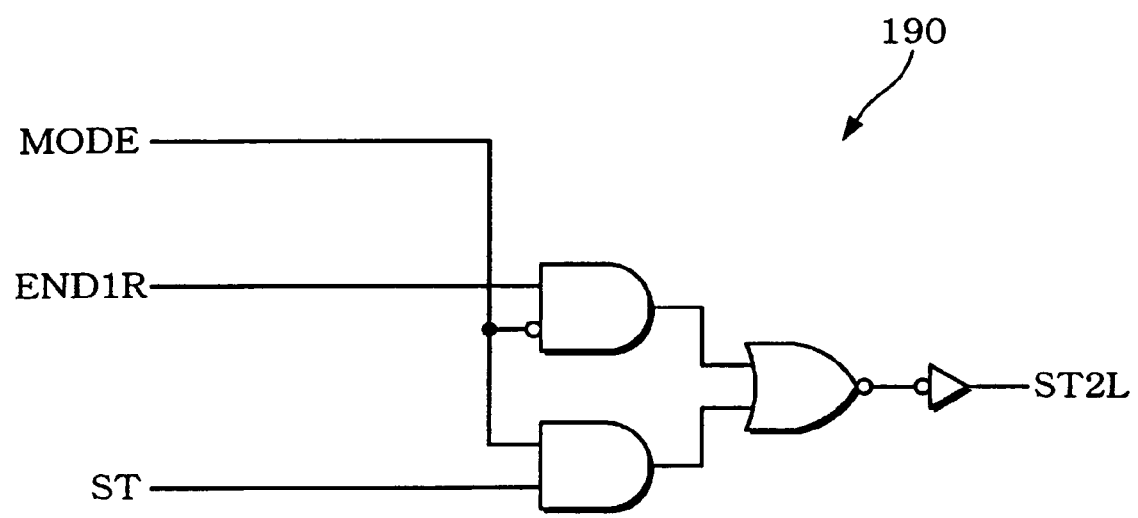
FIG. 12 is a circuit diagram showing a second shift start signal switch circuit according to one embodiment of the present invention.

FIG. 12 shows a configuration example of the second shift start signal switch circuit 190. The shift start signal ST (ST2R), the shift output END1R from the first bidirectional shift register 140, and the drive mode setting signal MODE are input to the second shift start signal switch circuit 190. The shift output END1R from the first bidirectional shift register 140 is the shift output in the final stage which has been shifted in the first direction in the first bidirectional shift register 140. In FIG. 12, the drive mode setting signal MODE is set at "L" during the normal drive mode and at "H" during the comb-tooth drive mode.

The second shift start signal switch circuit 190 is a selector which selectively outputs a signal based on the drive mode setting signal MODE. Specifically, the second shift start signal switch circuit 190 outputs either the shift start signal ST or the shift output END1R from the first bidirectional shift register 140 as the second opposite directional shift start signal ST2L according to the content of the drive mode setting register 192. In more detail, the second shift start signal switch circuit 190 outputs the shift output END1R from the first bidirectional shift register 140 as the second opposite directional shift start signal ST2L when the normal drive mode is set in the drive mode setting register 192. The second shift start signal switch circuit 190 outputs the shift start signal ST as the second opposite directional shift start signal ST2L when the comb-tooth drive mode is set in the drive mode setting register 192.

Figure 13:
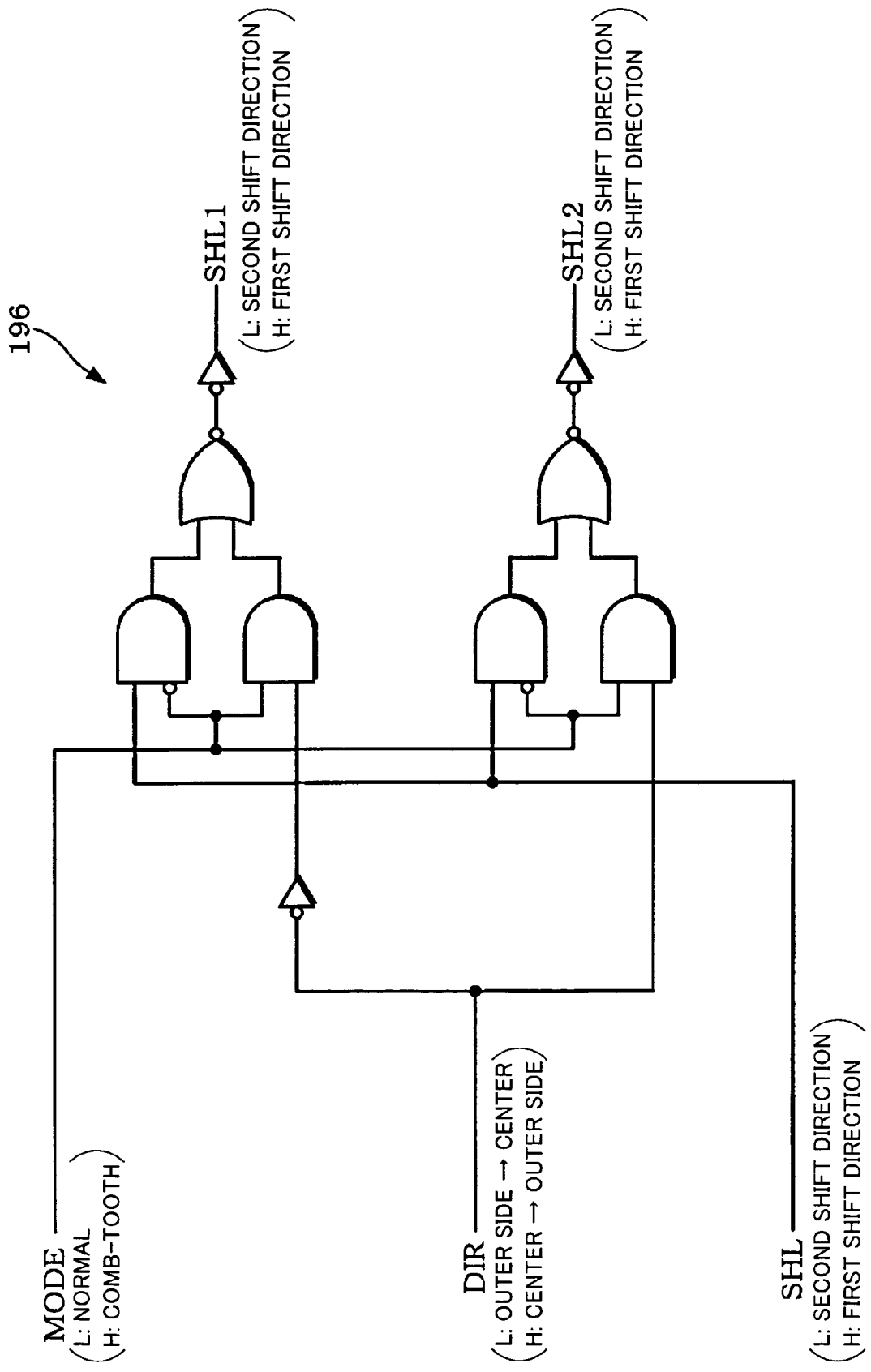
FIG. 13 is a circuit diagram showing a shift direction control circuit according to one embodiment of the present invention.

FIG. 13 shows a configuration example of the shift direction control circuit 196. The drive mode setting signal MODE, the shift direction setting signal DIR, and the shift direction control signal SHL are input to the shift direction control circuit 196.

In FIG. 13, the drive mode setting signal MODE is set at "L" during the normal drive mode and at "H" during the comb-tooth drive mode.

The shift direction setting signal DIR is a signal which indicates the shift direction set in the shift direction setting register 194. In FIG. 13, the shift direction setting signal DIR is set at "L" when the shift direction corresponds to the data capture direction from the outer side to the center as shown in FIG. 6A, and the shift direction setting signal DIR is set at "H" when the shift direction corresponds to the data capture direction from the center to the outer side as shown in FIG. 6B. In more detail, the shift direction of the first bidirectional shift register 140 is set to the first shift direction and the shift direction of the second bidirectional shift register 150 is set to the second shift direction when the shift direction setting signal DIR is set at "L". The shift direction of the first bidirectional shift register 140 is set to the second shift direction and the shift direction of the second bidirectional shift register 150 is set to the first shift direction when the shift direction setting signal DIR is set at "H". Therefore, the shift directions of the first and second bidirectional shift registers 140 and 150 are opposite directions in the comb-tooth drive mode in which the shift direction setting signal DIR is enabled.

The shift direction control signal SHL is a signal which indicates the shift directions of the first and second bidirectional shift registers 140 and 150 in the normal drive mode. The shift direction control signal SHL is set by the host, for example. In FIG. 13, the shift direction control signal SHL is set at an L level when the shift directions of the first and second bidirectional shift registers 140 and 150 are the second shift directions, and the shift direction control signal SHL is set at an H level when the shift directions of the first and second bidirectional shift registers 140 and 150 are the first shift directions. In the normal drive mode in which the shift direction control signal SHL is enabled, the shift direction control signal SHL is set so that the shift directions of the first and second bidirectional shift registers 140 and 150 are the same direction.

As shown in FIG. 13, the shift direction control circuit 196 is a selector which selectively outputs a signal based on the drive mode setting signal MODE. Specifically, the shift direction control circuit 196 outputs either the shift direction setting signal DIR or the shift direction control signal SHL according to the content of the drive mode setting register 192.

FIG. 14 shows a truth table of the shift direction control circuit 196 shown in FIG. 13.

FIGS. 15A, 15B, 15C, and 15D schematically show the shift directions of the first and second bidirectional shift registers 140 and 150 set by the shift direction control circuit 196.

As shown in FIG. 14, the shift direction control circuit 196 outputs the first and second shift direction control signals SHL1 and SHL2 so that the shift directions of the first and second bidirectional shift registers 140 and 150 are the same direction when the drive mode is set to the normal drive mode. In this case, the shift output END2L from the second bidirectional shift register 150 is supplied to the first bidirectional shift register 140 by the first shift start signal switch circuit 180 as the first opposite directional shift start signal ST1R. The shift output END1R from the first bidirectional shift register 140 is supplied to the second bidirectional shift register 150 by the second shift start signal switch circuit 190 as the second opposite directional shift start signal ST2L.

Therefore, the shift outputs SFO1 to SFO320 are consecutively output from the first and second bidirectional shift registers 140 and 150, as shown in FIG. 15A or 15B. This enables the first and second data latches 160 and 170, which capture the grayscale data on the grayscale bus 110 by using the shift outputs SFO1 to SFO320, to capture the grayscale data without changing the arrangement order of the grayscale data supplied to the grayscale bus 110.

As shown in FIG. 14, the shift direction control circuit 196 outputs the first and second shift direction control signals SHL1 and SHL2 so that the shift directions of the first and second bidirectional shift registers 140 and 150 are opposite directions when the drive mode is set to the comb-tooth drive mode. In more detail, the shift direction control circuit 196 outputs the first and second shift direction control signals SHL1 and SHL2 corresponding to the shift direction setting signal DIR so that the shift directions of the first and second bidirectional shift registers 140 and 150 are opposite directions when the drive mode is set to the comb-tooth drive mode.

In this case, the shift start signal ST is supplied to the first bidirectional shift register 140 as the first opposite directional shift start signal ST1R by the first shift start signal switch circuit 180. The shift start signal ST is supplied to the second bidirectional shift register 150 as the second opposite directional shift start signal ST2L by the second shift start signal switch circuit 190.

Therefore, the order of the shift outputs from the first and second bidirectional shift registers 140 and 150 is changed by the shift direction setting signal DIR, as shown in FIG. 15C or 15D. This enables the first and second data latches 160 and 170, which capture the grayscale data on the grayscale bus 110 by using the shift outputs SFO1 to SFO320, to capture the grayscale data while changing the arrangement order of the grayscale data supplied to the grayscale bus 110 corresponding to the shift direction setting signal DIR.

As described above, the first and second data latches 160 and 170 can capture the grayscale data on the grayscale bus 110 connected in common with the first and second data latches 160 and 170 based on the shift outputs which can be generated separately. This enables the latch data corresponding to the data output sections to be captured in the data latch 100 without changing the arrangement order of the grayscale data on the grayscale bus in the normal drive mode.

In the comb-tooth drive mode, the latch data corresponding to the data output sections can be captured in the data latch 100 while changing the arrangement order of the grayscale data on the grayscale bus. In this case, the comb-tooth distributed LCD panel 20 can be driven without using a data scramble IC by driving the data lines from the first side of the LCD panel 20 (electro-optical device) based on the data (LAT1 to LAT160) held in the flip-flops of the first data latch 160 and driving the data lines from the second side of the LCD panel 20 (electro-optical device) based on the data (LAT161 to LAT320) held in the flip-flops of the second data latch 170.

In the display driver 30, it is preferable that the first and second shift clock signals have the same phase in the normal drive mode. In the comb-tooth drive mode, it is preferable to generate the first and second shift clock signals by using a shift clock signal generation circuit as described below.

Figure 16:
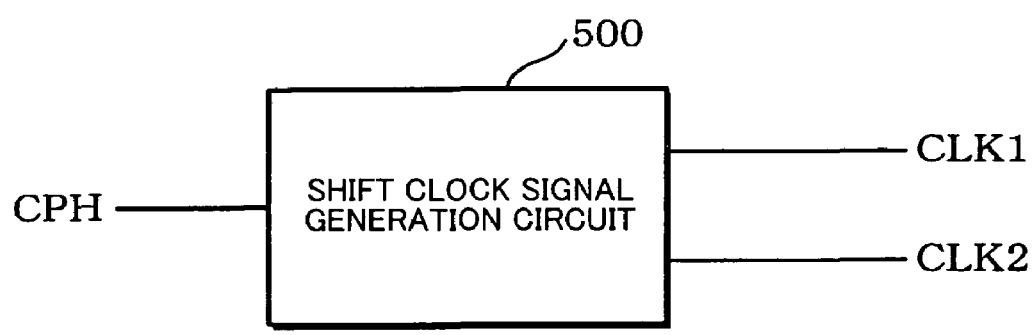
FIG. 16 is a diagram schematically showing a shift clock signal generation circuit according to one embodiment of the present invention.

FIG. 16 shows an outline of a configuration of a shift clock signal generation circuit. A shift clock signal generation circuit 500 generates the first and second shift clock signals CLK1 and CLK2 based on the reference clock signal CPH with which the grayscale data is supplied in synchronization. The shift clock signal generation circuit 500 generates the first and second shift clock signals CLK1 and CLK2 so that the first and second shift clock signals CLK1 and CLK2 include a period in which the phases of the first and second shift clock signals CLK1 and CLK2 are reversed. This enables the first and second shift clock signals CLK1 and CLK2 for obtaining the shift outputs generated separately to be generated by using a simple configuration.

In the shift clock signal generation circuit 500, the shift start signal ST and the first and second opposite directional shift start signals ST1R and ST2L input to the first and second bidirectional shift registers 140 and 150 are allowed to be signals having the same phase by generating the first and second shift clock signals CLK1 and CLK2 as described below, whereby the configuration and control can be simplified.

Figure 17:
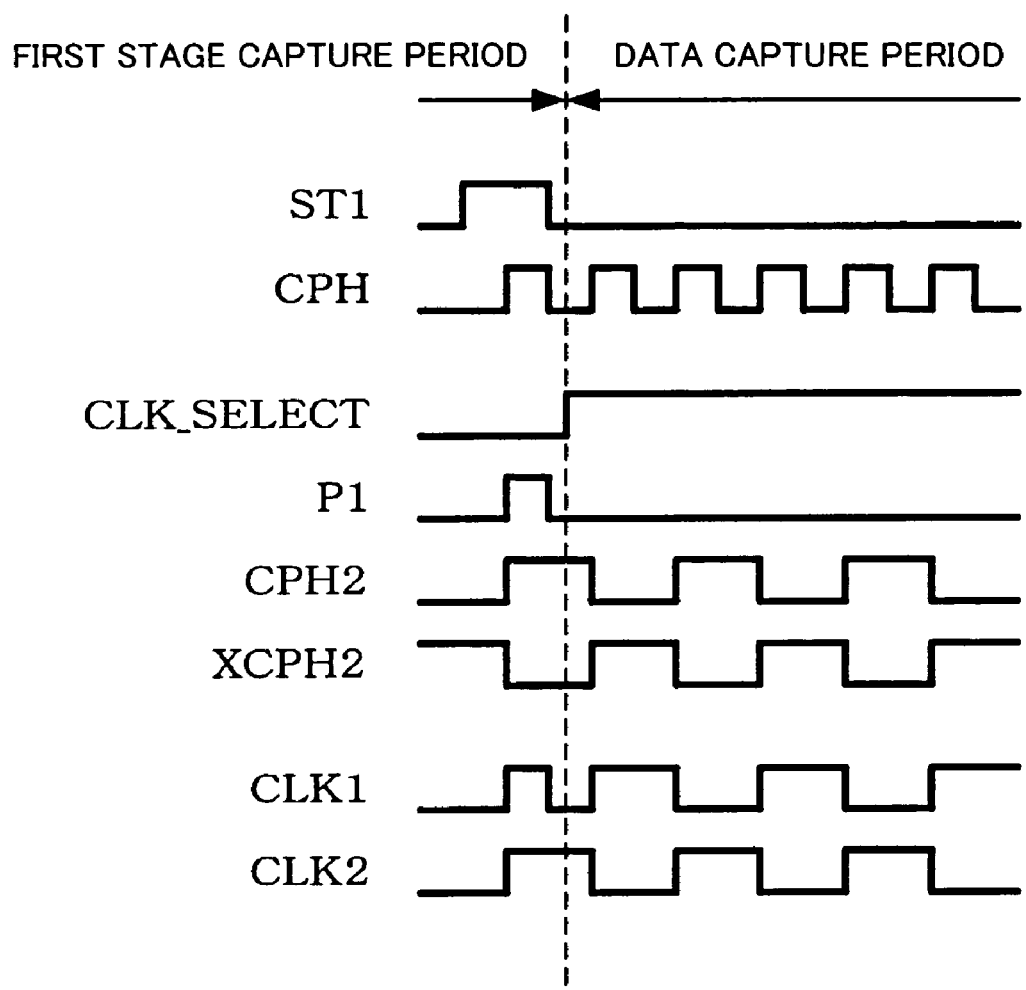
FIG. 17 is a timing chart showing timing of generating first and second reference shift clock signals by the shift clock signal generation circuit of FIG. 16.

FIG. 17 shows an example of generation timing of the first and second shift clock signals CLK1 and CLK2 by the shift clock signal generation circuit 500. In order to allow each shift start signal input to the first and second bidirectional shift registers 140 and 150 to be signals having the same phase, it is necessary to capture the shift start signal ST (ST1L and ST2R) and the first and second opposite directional shift start signals ST1R and ST2L in the first stages of the first and second bidirectional shift registers 140 and 150.

The shift clock signal generation circuit 500 generates a clock signal select signal CLK_SELECT which specifies a first stage capture period and a data capture period (shift operation period). The first stage capture period may be referred to as a period in which the shift start signal ST1L (ST1R) is captured in the first bidirectional shift register 140 or a period in which the shift start signal ST2R (ST2L) is captured in the second bidirectional shift register 150. The data capture period may be referred to as a period in which the shift start signal captured in the first stage capture period is shifted after the first stage capture period has elapsed.

The first and second shift clock signals CLK1 and CLK2 are provided with edges for capturing the shift start signals ST1L (ST1R) and ST2R (ST2L) by using the clock signal select signal CLK_SELECT.

Therefore, a pulse P1 of the reference clock signal CPH is generated in the first stage capture period. A frequency-divided clock signal CPH2 is generated by dividing the frequency of the reference clock signal CPH. The frequency-divided clock signal CPH2 is the second shift clock signal CLK2. An inverted frequency-divided clock signal XCPH2 is generated by reversing the phase of the frequency-divided clock signal CPH2.

The first shift clock signal CLK1 is generated by selectively outputting the pulse P1 of the reference clock signal CPH in the first stage capture period and selectively outputting the inverted frequency-divided clock signal XCPH2 in the data capture period by using the clock signal select signal CLK_SELECT.

Figure 18:
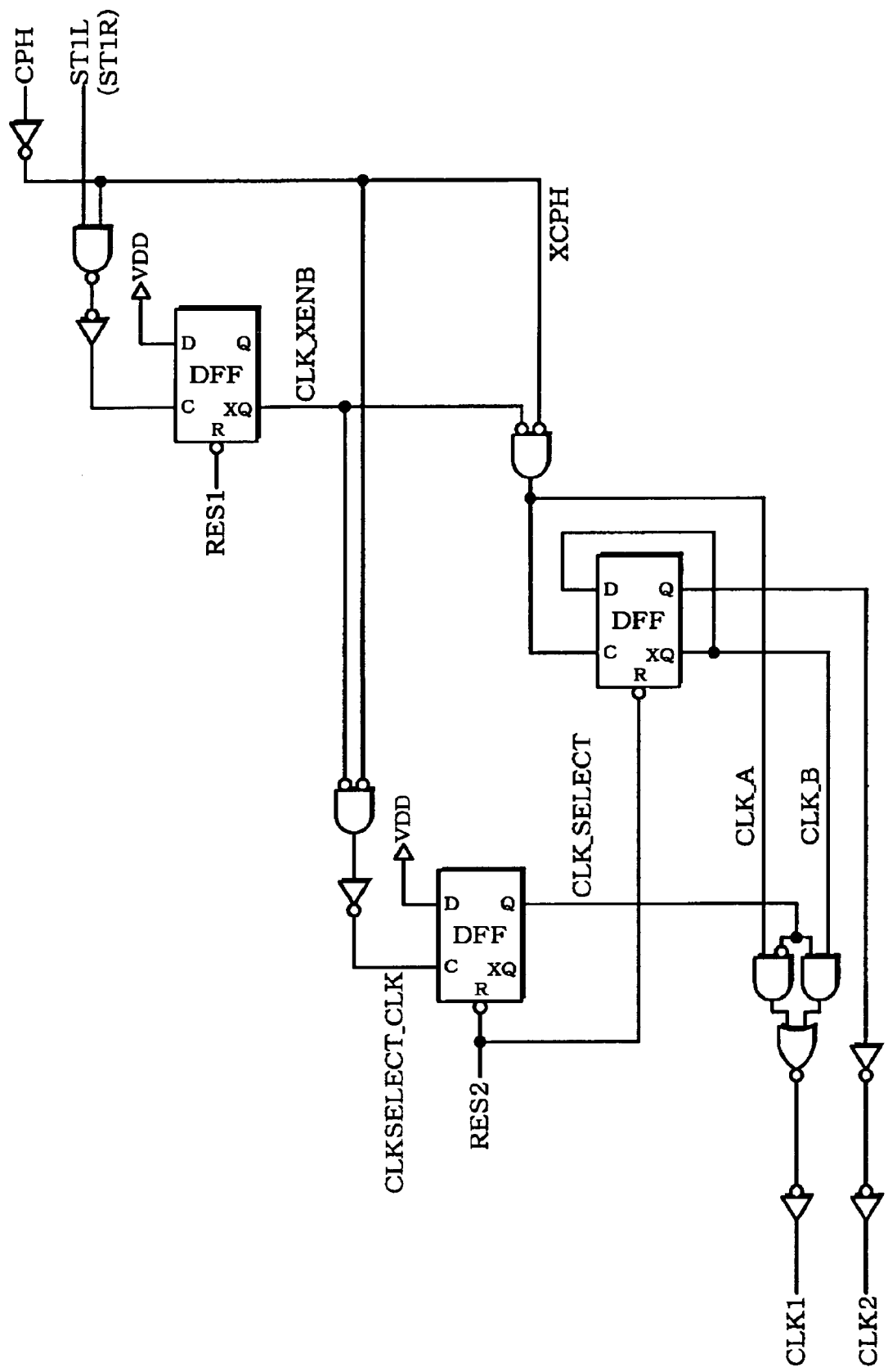
FIG. 18 is a circuit diagram showing the shift clock signal generation circuit of FIG. 16.

FIG. 18 shows a circuit diagram which is a specific configuration example of the shift clock signal generation circuit 500.

FIG. 14 shows an example of operation timing of the shift clock signal generation circuit 500 shown in FIG. 13.

Figure 19:
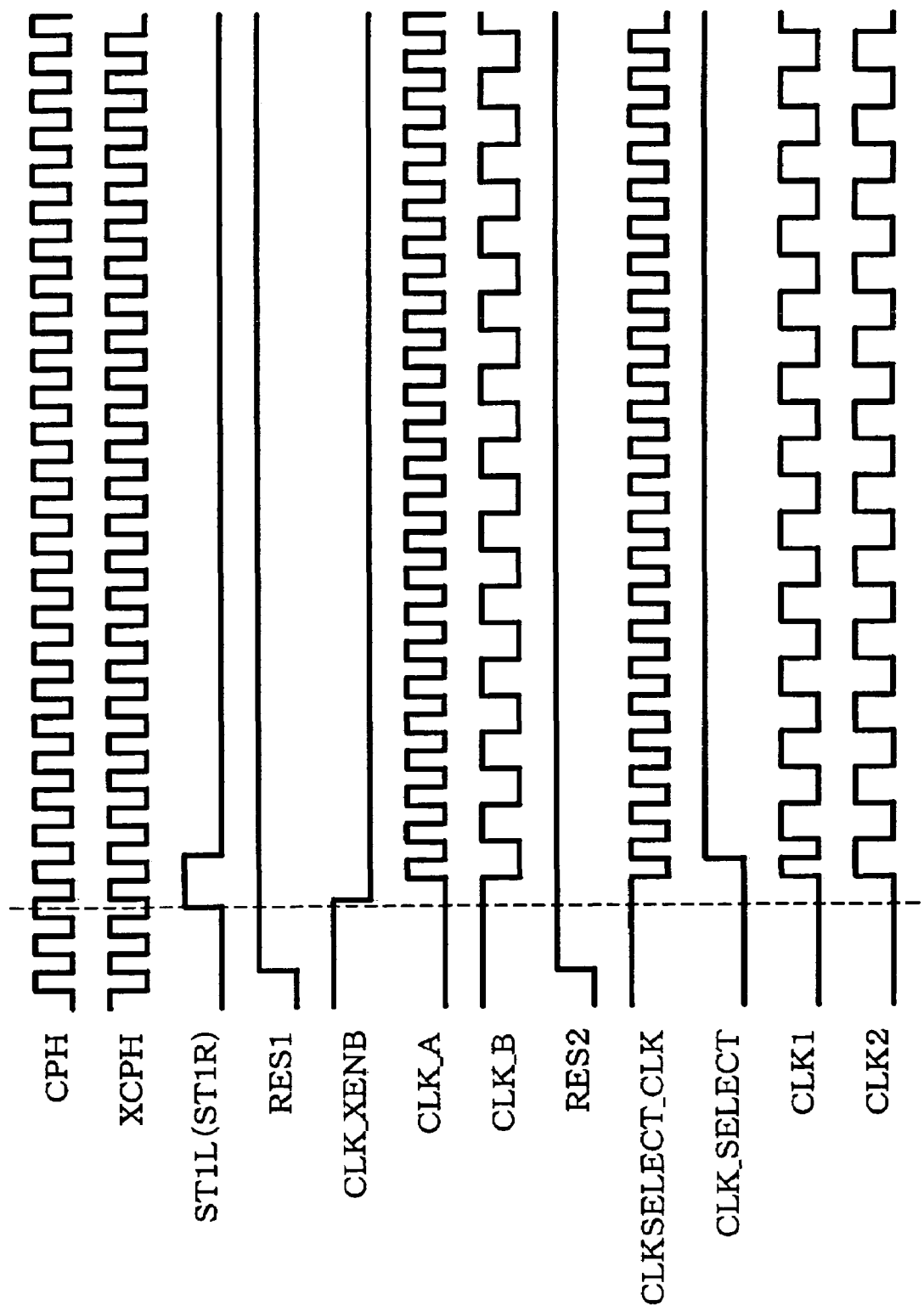
FIG. 19 is a timing chart showing the operation of the shift clock signal generation circuit of FIG. 16.

In FIGS. 18 and 19, clock signals CLK_A and CLK_B are generated by using the reference clock signal CPH, and selectively output by using the clock signal select signal CLK_SELECT. The second shift clock signal CLK2 is a signal generated by reversing the clock signal CLK_B. The first shift clock signal CLK1 is a signal generated by selectively outputting the clock signal CLK_A in the first stage capture period in which the clock signal select signal CLK_SELECT is set at "L", and selectively outputting the clock signal CLK_B in the data capture period in which the clock signal select signal CLK_SELECT is set at "H".

The operation of the data latch 100 of the display driver 30 having the above-described configuration is described below.

Figure 20:
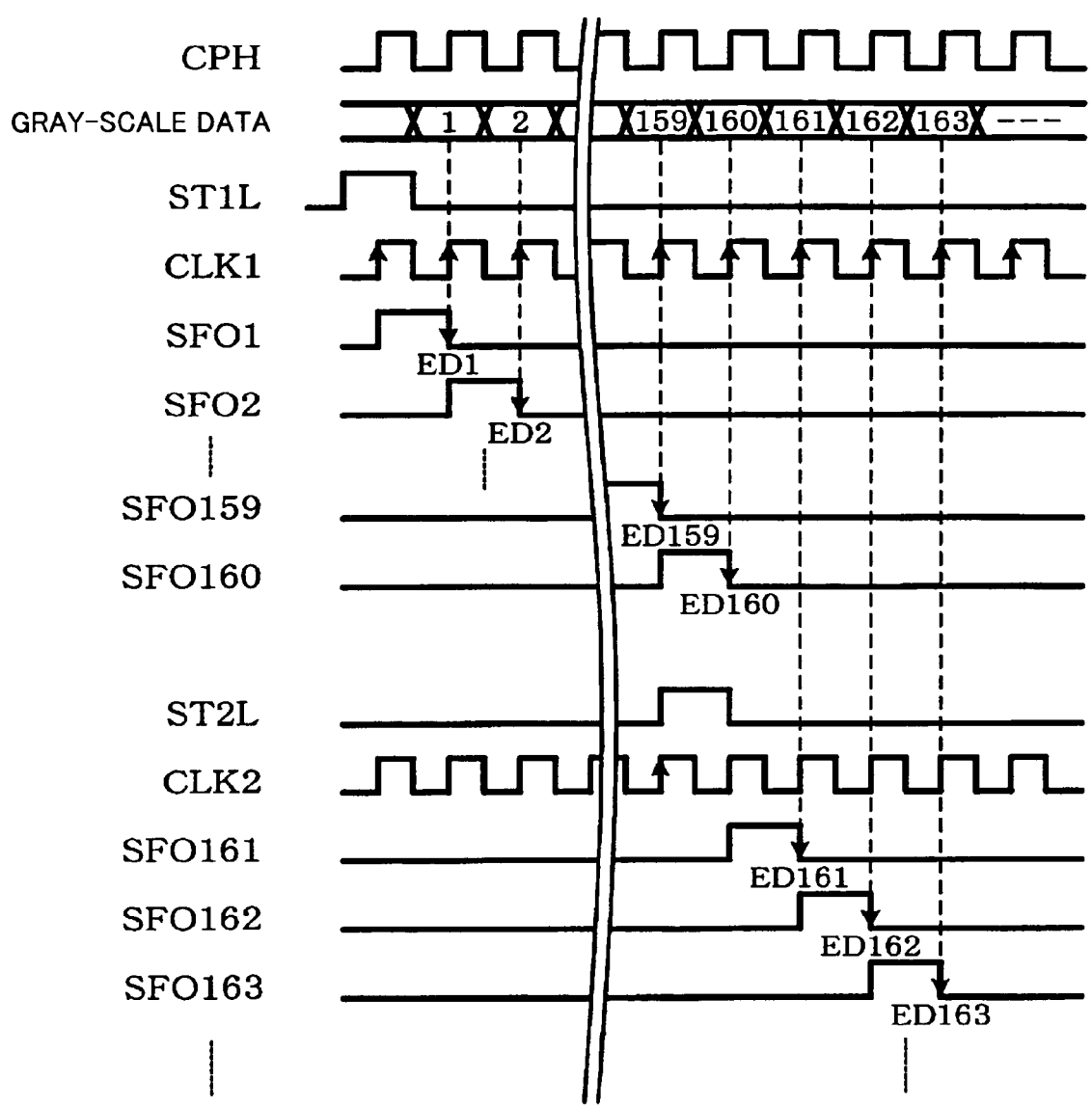
FIG. 20 is a timing chart showing an example of operation by the data latch of the display driver according to one embodiment of the present invention in a normal drive mode.

FIG. 20 shows an example of an operation timing chart of the data latch 100 of the display driver 30.

FIG. 20 shows a timing example in the case where the first and second shift direction control signals SHL1 and SHL2 are set at "L" in the normal drive mode, and the first and second bidirectional shift registers 140 and 150 shift the signals as shown in FIG. 15A.

The grayscale data is supplied to the grayscale bus 110 corresponding to the arrangement order of the data lines DL1 to DLN of the LCD panel 20. In this example, the grayscale data corresponding to the data line DL1 is illustrated as DATA1 ("1" in FIG. 20), the grayscale data corresponding to the data line DL2 is illustrated as DATA2 ("2" in FIG. 20), and so on.

The first bidirectional shift register 140 outputs the shift outputs SFO1 to SFO160 generated by shifting the shift start signal ST1L in that order in synchronization with the rising edge of the first shift clock signal CLK1.

The second bidirectional shift register 150 outputs the shift outputs SFO161 to SFO320 generated by shifting the shift output END1R in the final stage of the first bidirectional shift register 140 (shift output SFO160 in FIG. 20) in that order in synchronization with the rising edge of the second shift clock signal CLK2.

The first data latch 160 captures the grayscale data on the grayscale bus 110 at the falling edge of each shift output from the first bidirectional shift register 140. As a result, the first data latch 160 captures the grayscale data DATA1 at a falling edge ED1 of the shift output SFO1, captures the grayscale data DATA2 at a falling edge ED2 of the shift output SFO2, captures the grayscale data DATA3 at a falling edge ED3 of the shift output SFO3, and so on.

The second data latch 170 captures the grayscale data on the grayscale bus 110 at the falling edge of each shift output from the second bidirectional shift register 150. As a result, the second data latch 170 captures the grayscale data DATA161 at a falling edge ED161 of the shift output SFO161, captures the grayscale data DATA162 at a falling edge ED162 of the shift output SFO162, captures the grayscale data DATA163 at a falling edge ED163 of the shift output SFO163, and so on.

This enables the grayscale data supplied to the grayscale bus corresponding to the data lines of a conventional LCD panel, which is not comb-tooth distributed, to be captured in the correct order. Therefore, the grayscale data DATA1 to DATA320 is supplied to the corresponding data lines DL1 to DL320 of the LCD panel which is not comb-tooth distributed, whereby a correct image can be displayed.

Figure 21:
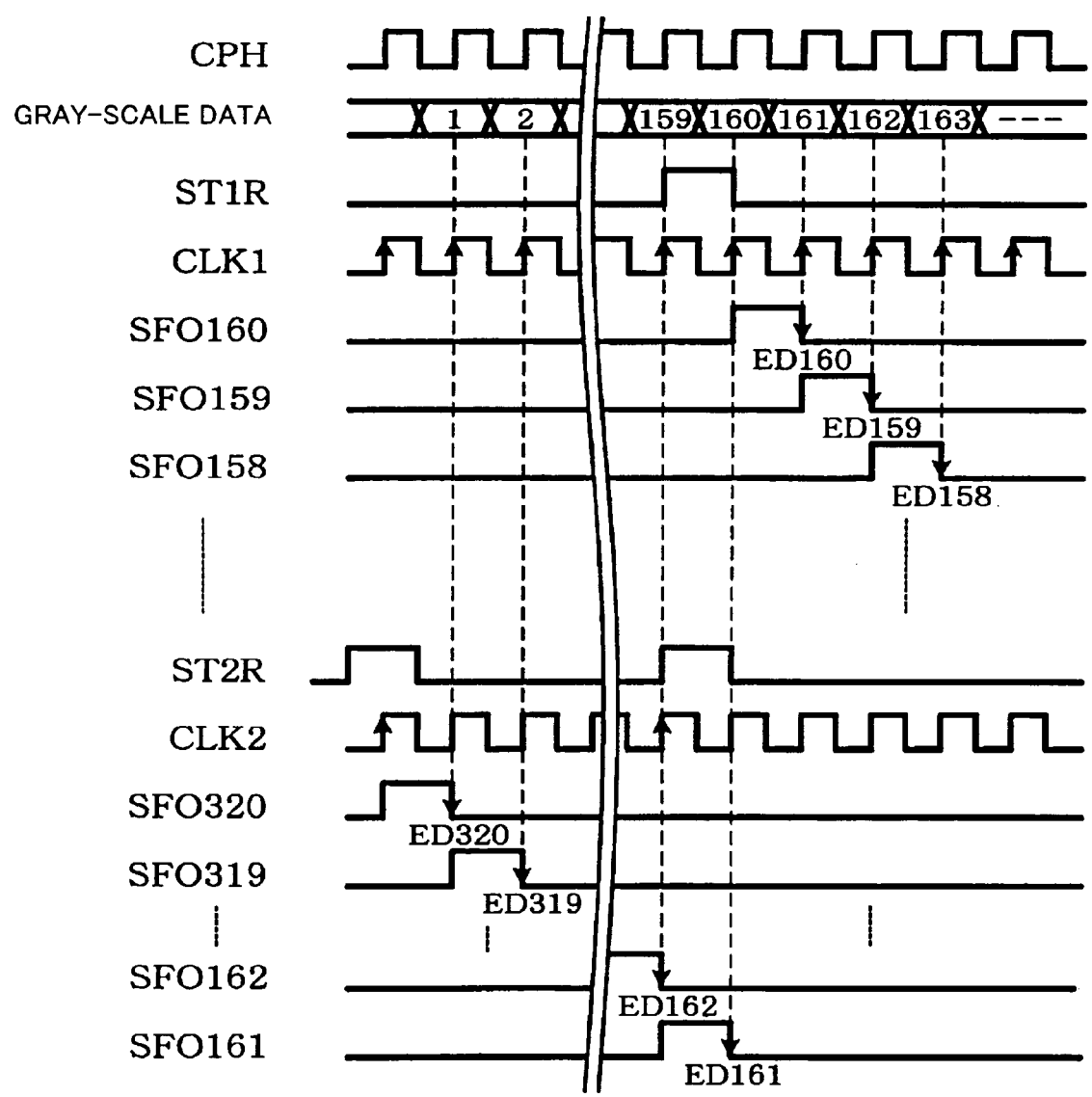
FIG. 21 is a timing chart showing another example of operation by the data latch of the display driver according to one embodiment of the present invention in a normal drive mode.

FIG. 21 shows another example of the operation timing chart of the data latch 100 of the display driver 30.

FIG. 21 shows a timing example in the case where the first and second shift direction control signals SHL1 and SHL2 are set at "H" in the normal drive mode, and the first and second bidirectional shift registers 140 and 150 shift the signals as shown in FIG. 15B.

The second bidirectional shift register 150 outputs the shift outputs SFO320 to SFO161 generated by shifting the shift start signal ST2R in that order in synchronization with the rising edge of the second shift clock signal CLK2.

The first bidirectional shift register 140 outputs the shift outputs SFO160 to SFO1 generated by shifting the shift output END2L in the final stage of the second bidirectional shift register 150 (shift output SFO161 in FIG. 21) in that order in synchronization with the rising edge of the first shift clock signal CLK1.

As a result, the second data latch 170 captures the grayscale data DATA1 at a falling edge ED320 of the shift output SFO320, captures the grayscale data DATA2 at a falling edge ED319 of the shift output SFO319, captures the grayscale data DATA3 at a falling edge ED318 of the shift output SFO318, and so on.

The first data latch 160 captures the grayscale data DATA161 at a falling edge ED160 of the shift output SFO160, captures the grayscale data DATA162 at a falling edge ED159 of the shift output SFO159, captures the grayscale data DATA163 at a falling edge ED158 of the shift output SFO158, and so on.

This enables the grayscale data supplied to the grayscale bus corresponding to the data lines of a conventional LCD panel which is not comb-tooth distributed to be captured in the correct order even in a distribution state (or a mounting state) differing from that of FIG. 20. Therefore, the grayscale data DATA1 to DATA320 is supplied to the corresponding data lines DL1 to DL320 of the LCD panel which is not comb-tooth distributed, whereby a correct image can be displayed.

Figure 22:
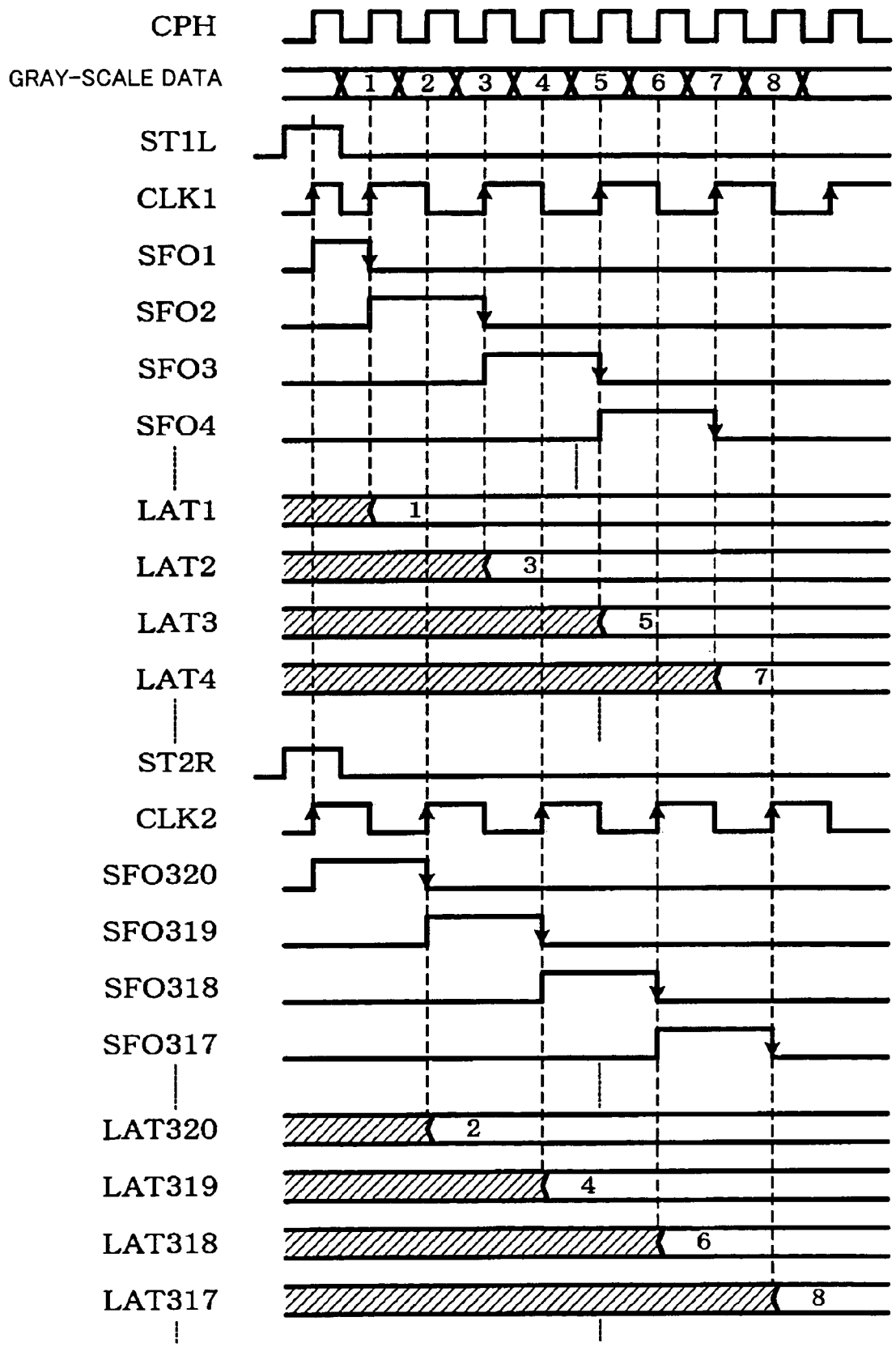
FIG. 22 is a timing chart showing an example of operation by the data latch of the display driver according to one embodiment of the present invention in a comb-tooth drive mode.

FIG. 22 shows still another example of the operation timing chart of the data latch 100 of the display driver 30.

FIG. 22 shows a timing example in the case where the first shift direction control signal SHL1 is set at "H" and the second shift direction control signal SHL2 is set at "L" in the comb-tooth drive mode. The first and second shift clock signals CLK1 and CLK2 are generated as shown in FIG. 17 or 19.

The grayscale data is supplied to the grayscale bus 110 corresponding to the arrangement order of the data lines DL1 to DLN of the LCD panel 20. In this example, the grayscale data corresponding to the data line DL1 is illustrated as DATA1 ("1" in FIG. 22), the grayscale data corresponding to the data line DL2 is illustrated as DATA2 ("2" in FIG. 22), and so on.

The first bidirectional shift register 140 outputs the shift outputs SFO1 to SFO160 generated by shifting the shift start signal ST1L in that order in synchronization with the rising edge of the first shift clock signal CLK1.

The second bidirectional shift register 150 outputs the shift outputs SFO320 to SFO161 generated by shifting the shift start signal ST2R in that order in synchronization with the rising edge of the second shift clock signal CLK2 during the shift operation of the first bidirectional shift register 140.

The first data latch 160 captures the grayscale data on the grayscale bus 110 at the falling edge of each shift output from the first bidirectional shift register 140. As a result, the first data latch 160 captures the grayscale data DATA1 at the falling edge of the shift output SFO1, captures the grayscale data DATA3 at the falling edge of the shift output SFO2, captures the grayscale data DATA5 at the falling edge of the shift output SFO3, and so on.

The second data latch 170 captures the grayscale data on the grayscale bus 110 at the falling edge of each shift output from the second bidirectional shift register 150. As a result, the second data latch 170 captures the grayscale data DATA2 at the falling edge of the shift output SFO320, captures the grayscale data DATA4 at the falling edge of the shift output SFO319, captures the grayscale data DATA6 at the falling edge of the shift output SFO318, and so on.

This enables the grayscale data after data scrambling (see FIG. 5) corresponding to the data lines of the comb-tooth distributed LCD panel 20 to be captured. Therefore, the grayscale data DATA1 to DATA320 is supplied to the corresponding data lines DL1 to DL320 of the LCD panel 20 shown in FIG. 1 or 4, whereby a correct image can be displayed.

Figure 23:
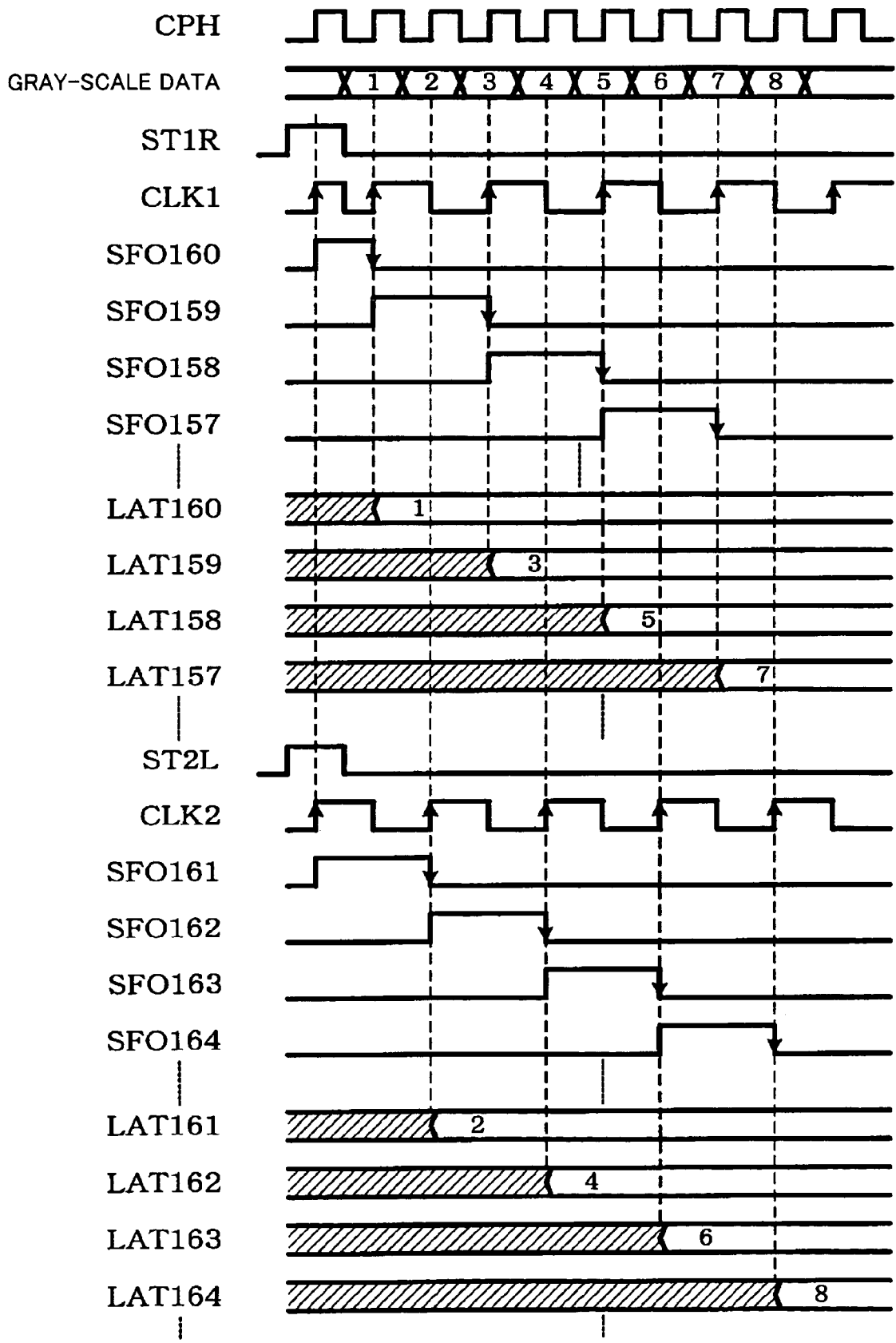
FIG. 23 is a timing chart showing another example of operation by the data latch of the display driver according to one embodiment of the present invention in a comb-tooth drive mode.

FIG. 23 shows yet another example of the operation timing chart of the data latch 100 of the display driver 30.

FIG. 23 shows a timing example in the case where the first shift direction control signal SHL1 is set at "L" and the second shift direction control signal SHL2 is set at "H" in the comb-tooth drive mode. The first and second shift clock signals CLK1 and CLK2 are generated as shown in FIG. 17 or 19.

The first bidirectional shift register 140 outputs the shift outputs SFO160 to SFO1 generated by shifting the shift start signal ST1R in that order in synchronization with the rising edge of the first shift clock signal CLK1.

The second bidirectional shift register 150 outputs the shift outputs SFO161 to SFO320 generated by shifting the shift start signal ST2L in that order in synchronization with the rising edge of the second shift clock signal CLK2 during the shift operation of the first bidirectional shift register 140.

The first data latch 160 captures the grayscale data DATA1 at the falling edge of the shift output SFO160, captures the grayscale data DATA3 at the falling edge of the shift output SFO159, captures the grayscale data DATA5 at the falling edge of the shift output SFO158, and so on.

The second data latch 170 captures the grayscale data on the grayscale bus 110 at the falling edge of each shift output from the second bidirectional shift register 150. As a result, the second data latch 170 captures the grayscale data DATA2 at the falling edge of the shift output SFO161, captures the grayscale data DATA4 at the falling edge of the shift output SFO162, captures the grayscale data DATA6 at the falling edge of the shift output SFO163, and so on.

This enables drive based on the grayscale data DATA1 from the data output section OUT160, drive based on the grayscale data DATA2 from the data output section OUT161, and so on to be performed as shown in FIG. 6B by changing the capture direction of the grayscale data, whereby a correct image can be displayed even in the case shown in FIG. 6B.

3. Other Embodiments

In the case of driving the data lines of the comb-tooth distributed LCD panel 20 by using the display driver 30 (in the case of driving the LCD panel 20 in the comb-tooth drive mode), it is preferable to change the arrangement order of the grayscale data corresponding to the distribution state of the display driver 30.

Figure 24A:
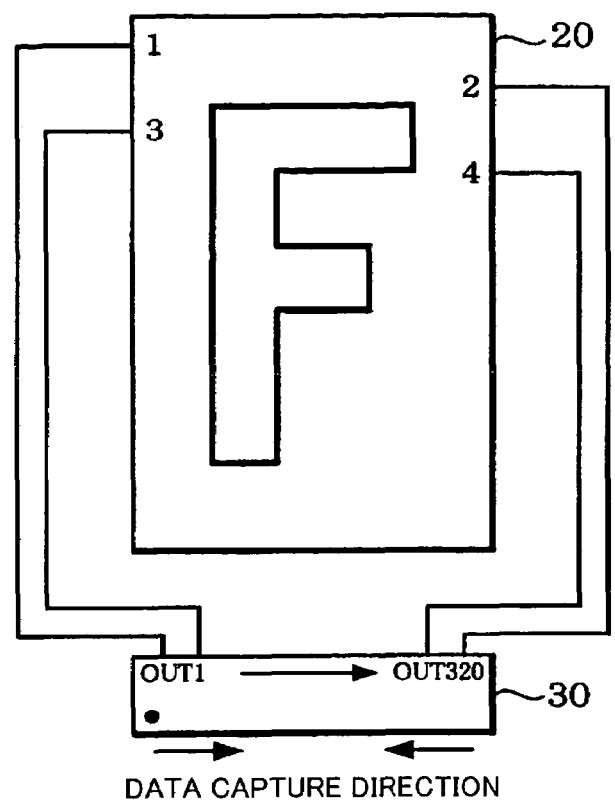
FIG. 24A is a diagram schematically showing a third distribution state of a display driver for an LCD panel according to one embodiment of the present invention.
Figure 24B:
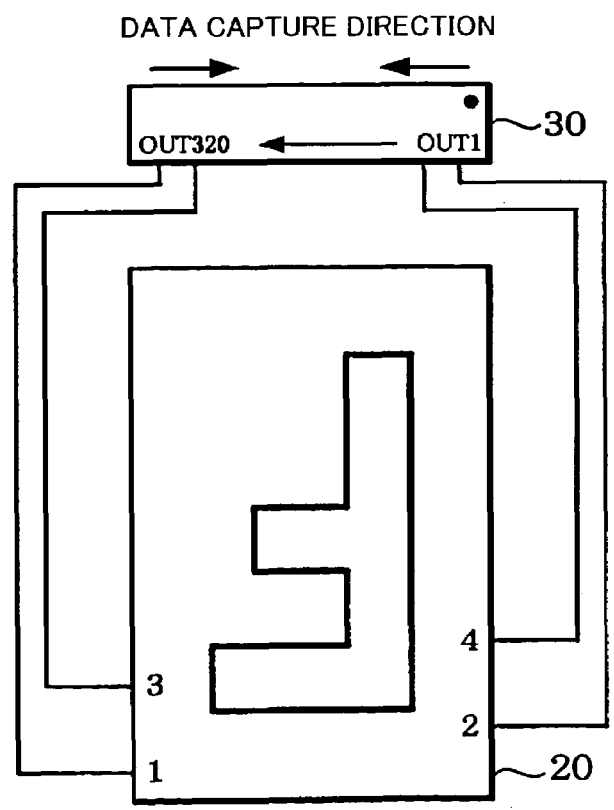
FIG. 24B is a diagram schematically showing a fourth distribution state of a display driver for the LCD panel.

FIG. 24A schematically shows a third distribution state (or a third mounting state) of the display driver 30 relative to the LCD panel 20. FIG. 24B schematically shows a fourth distribution state of the display driver 30 relative to the LCD panel 20.

In this example, the display driver 30 can change the arrangement order of the grayscale data in order to display the image shown in FIG. 24A. Therefore, the display driver 30 captures the grayscale data DATA1, DATA2, DATA3, . . . in the order of the data output section OUT1, the data output section OUT320, and the data output section OUT2, . . . , as shown in FIG. 5 (the third distribution state).

However, if the display driver 30 captures the grayscale data in the same order in the fourth distribution state, since the drive voltage based on the grayscale data DATA1 is output from the data output section OUT1, the image shown in FIG. 24B cannot be displayed.

This problem also occurs depending on whether the display driver 30 is mounted on the LCD panel 20 in a state in which the front surface or the back surface of the chip of the display driver 30 faces the LCD panel 20.

In the display driver 30, it is preferable to change the arrangement order of the grayscale data and the capture start order of the grayscale data corresponding to the distribution state.

Therefore, a clock signal switch circuit may be provided to the data latch of the display driver 30.

Figure 25:
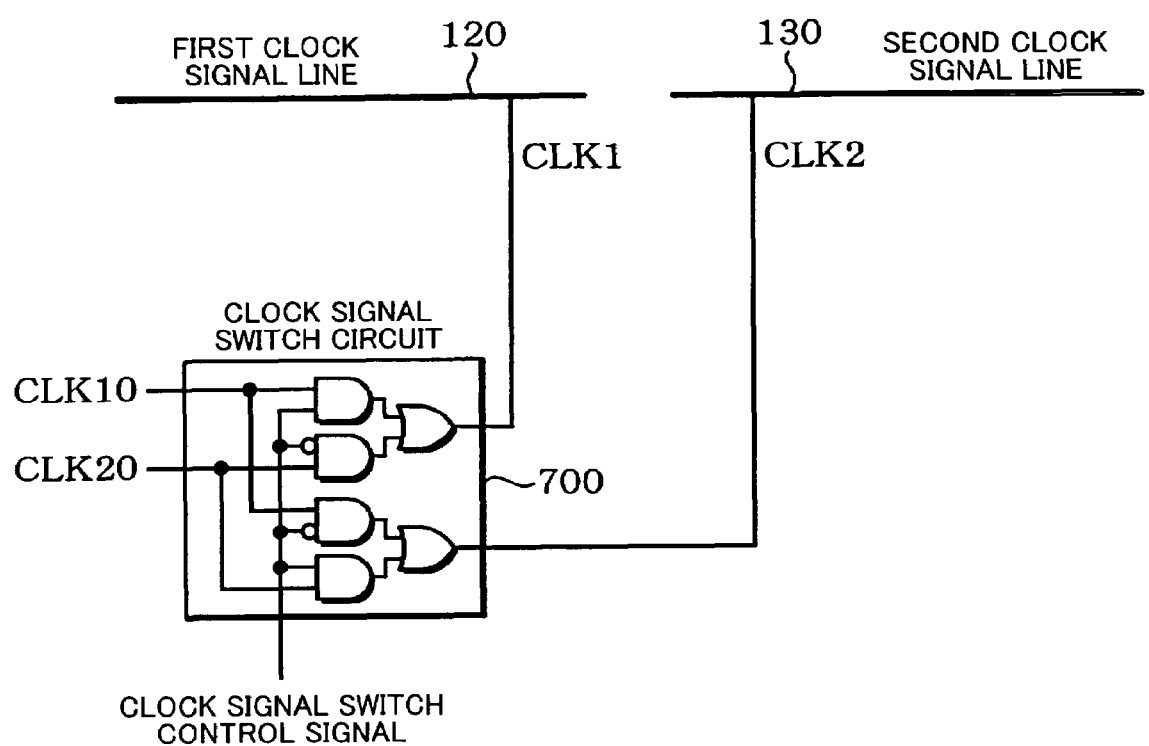
FIG. 25 is a circuit diagram showing a clock signal switch circuit according to one embodiment of the present invention.

FIG. 25 shows a configuration example of a clock signal switch circuit. A clock signal switch circuit 700 may be included in the data latch 100 shown in FIG. 8.

The clock signal switch circuit 700 outputs one of the first and second shift clock signals CLK1 and CLK2 to the first clock signal line 120 and outputs the other of the first and second shift clock signals CLK1 and CLK2 to the second clock signal line 130 based on a given clock signal switch control signal. The clock signal switch control signal is a signal which is set corresponding to the distribution state of the display driver 30. The clock signal switch control signal is set by the host, for example.

In more detail, when the clock signal switch control signal is set at "H" (first level), the clock signal switch circuit 700 outputs a first reference shift clock signal CLK10 to the first clock signal line 120 as the first shift clock signal CLK1 and outputs a second reference shift clock signal CLK20 to the second clock signal line 130 as the second shift clock signal CLK2. When the clock signal switch control signal is set at "L" (second level), the clock signal switch circuit 700 outputs the second reference shift clock signal CLK20 to the first clock signal line 120 as the first shift clock signal CLK1, and outputs the first reference shift clock signal CLK10 to the second clock signal line 130 as the second shift clock signal CLK2.

The first and second reference shift clock signals CLK10 and CLK20 are generated by the shift clock signal generation circuit 500 shown in FIG. 16 based on the reference clock signal CPH instead of the first and second shift clock signals CLK1 and CLK2.

Since the shift clock signals output to the first and second clock signal lines 120 and 130 can be replaced by using the clock signal switch control signal, the capture start order of the grayscale data by the first and second bidirectional shift registers 140 and 150 can be changed. Therefore, the capture start order of the grayscale data can be changed corresponding to the distribution state of the display driver 30.

Figure 26:
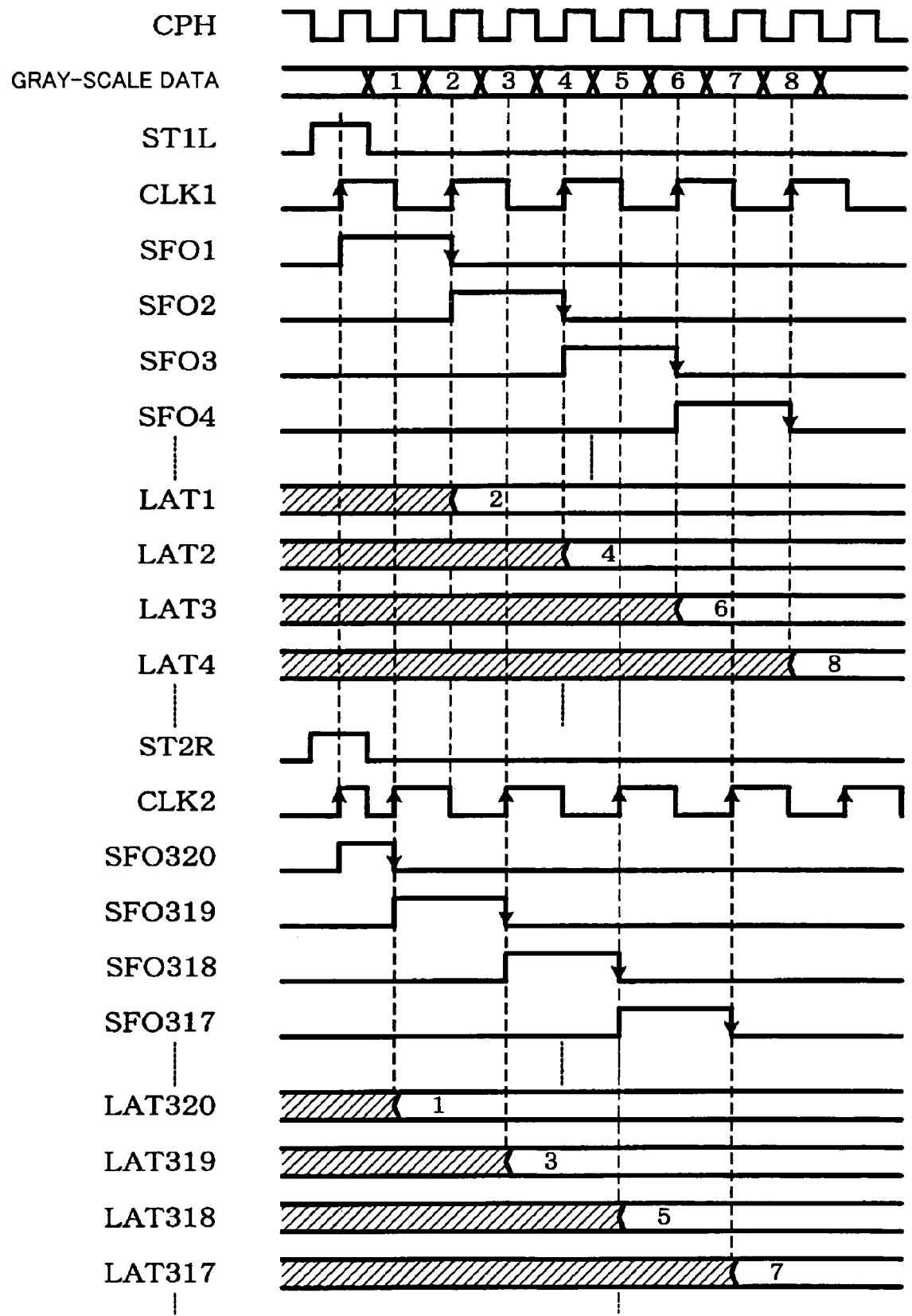
FIG. 26 is a timing chart showing an example of operation by the data latch including the clock signal switch circuit of FIG. 25.

FIG. 26 shows an example of an operation timing chart in the case where the data latch 100 shown in FIG. 8 includes the clock signal switch circuit 700.

FIG. 26 shows a timing example in the case where the first shift direction control signal SHL1 is set at "H" and the second shift direction control signal SHL2 is set at "L" in the comb-tooth drive mode. FIG. 26 shows a timing example in the case where the clock signal switch control signal is set at "L". Therefore, the first and second shift clock signals CLK1 and CLK2 are replaced in comparison with FIG. 22.

The first bidirectional shift register 140 outputs the shift outputs SFO1 to SFO160 generated by shifting the shift start signal ST1L in that order in synchronization with the rising edge of the first shift clock signal CLK1.

The second bidirectional shift register 150 outputs the shift outputs SFO320 to SFO161 generated by shifting the shift start signal ST2R in that order in synchronization with the rising edge of the second shift clock signal CLK2 during the shift operation of the first bidirectional shift register 140.

The first data latch 160 captures the grayscale data DATA2 at the falling edge of the shift output SFO1, captures the grayscale data DATA4 at the falling edge of the shift output SFO2, captures the grayscale data DATA6 at the falling edge of the shift output SFO3, and so on.

The second data latch 170 captures the grayscale data DATA1 at the falling edge of the shift output SFO320, captures the grayscale data DATA3 at the falling edge of the shift output SFO319, and captures the grayscale data DATA5 at the falling edge of the shift output SFO318.

This enables drive based on the grayscale data DATA1 from the data output section OUT320, drive based on the grayscale data DATA2 from the data output section OUT1, and so on to be performed as shown in FIG. 24B by changing the capture start timing of the grayscale data, whereby a correct image can be displayed even in the case shown in FIG. 24B.

The present invention is not limited to the above-described embodiment. Various modifications and variations are possible within the spirit and scope of the present invention. The above embodiment is described taking as an example an active matrix type liquid crystal display panel in which each pixel of the display panel includes a TFT. However, the present invention is not limited thereto. The present invention can also be applied to a passive matrix type liquid crystal display panel. The present invention can be applied to a plasma display device in addition to the liquid crystal display panel, for example.

In the case of forming one pixel by using three dots, the present invention can be realized in the same manner as described above by replacing the data line with a set of three color component data lines.

The invention according to the dependent claims may have a configuration in which a part of the constituent elements of the claim on which the invention is dependent is omitted. It is possible to allow the feature of the invention according to one independent claim to depend on another independent claim.

The following features are disclosed relating to the above-described embodiments.

According to one embodiment of the present invention, there is provided a display driver which drives a plurality of data lines of an electro-optical device, the electro-optical device having a plurality of scanning lines, the data lines which are alternately arranged inwardly from opposite sides of the electro-optical device in the shape of comb teeth, a plurality of switching elements respectively connected to the scanning lines and the data lines, and a plurality of pixel electrodes respectively connected to the switching elements, the display driver comprising:

a grayscale bus to which grayscale data is supplied corresponding to an arrangement order of the data lines;

a first bidirectional shift register which shifts a shift start signal in a first shift direction and shifts a first opposite directional shift start signal in a second shift direction which is opposite to the first shift direction, based on a first shift clock signal, and outputs a shift output shifted in one of the first and second shift directions specified by a first shift direction control signal;

a second bidirectional shift register which shifts the shift start signal in the second shift direction and shifts a second opposite directional shift start signal in the first shift direction, based on a second shift clock signal, and outputs a shift output shifted in one of the first and second shift directions specified by a second shift direction control signal;

a drive mode setting register in which one of a normal drive mode and a comb-tooth drive mode is set;

a first shift start signal switch circuit which outputs the shift start signal or a shift output in a final stage of the second bidirectional shift register as the first opposite directional shift start signal, corresponding to the content of the drive mode setting register, the shift output having been shifted in the second shift direction in the second bidirectional shift register;

a second shift start signal switch circuit which outputs the shift start signal or a shift output in a final stage of the first bidirectional shift register as the second opposite directional shift start signal, corresponding to the content of the drive mode setting register, the shift output having been shifted in the first shift direction in the first bidirectional shift register;

a first data latch which has a plurality of flip-flops each of which holds the grayscale data corresponding to one of the data lines based on a shift output in each stage of the first bidirectional shift register;

a second data latch which has a plurality of flip-flops each of which holds the grayscale data corresponding to one of the data lines based on a shift output in each stage of the second bidirectional shift register; and a data line driver circuit in which a plurality of data output sections are arranged corresponding to the arrangement order of the data lines, each of the data output sections driving one of the data lines based on the grayscale data held in one of the flip-flops of the first or second data latch.

In this display driver, the grayscale data supplied to the grayscale bus corresponding to the arrangement order of the data lines of the electro-optical device can be captured in the first and second data latches by using the shift outputs based on the first and second shift clock signals which can be separately set. In the first and second bidirectional shift registers, shift directions of the first and second shift start signals can be changed corresponding to the shift direction control signal.

The first shift start signal switch circuit is provided and either the shift output in the final stage of the second bidirectional shift register or the shift start signal is input to the first bidirectional shift register corresponding to the drive mode, as the first opposite directional shift start signal to be input to the first bidirectional shift register. The second shift start signal switch circuit is provided and either the shift output in the final stage of the first bidirectional shift register or the shift start signal is input to the second bidirectional shift register corresponding to the drive mode, as the second opposite directional shift start signal to be input to the second bidirectional shift register.

This enables to change the arrangement order of the grayscale data on the grayscale bus, and also enables the grayscale data to be captured in the first and second data latches. Therefore, a comb-tooth distributed electro-optical device can be driven without using a data scramble IC as an additional circuit.

Moreover, the capture direction of the grayscale data can be changed by changing shift directions of the shift outputs from the first and second bidirectional shift registers by the first and second shift direction control signals. Therefore, the arrangement order of the grayscale data and the capture direction of the grayscale data can be changed corresponding to the orientation of an image to be displayed.

Furthermore, since shift directions set in the first and second bidirectional shift registers can be changed, a display driver which can change the capture order of the grayscale data corresponding to the drive mode can be provided.

This display driver may further comprise:

a shift direction control circuit which outputs the first and second shift direction control signals based on the content of the drive mode setting register, wherein:

shift directions of the first and second bidirectional shift registers specified by the first and second shift direction control signals may be the same when the normal drive mode is set in the drive mode setting register; and shift directions of the first and second bidirectional shift registers specified by the first and second shift direction control signals may be opposite when the comb-tooth drive mode is set in the drive mode setting register.

This enables to provide a display driver in which both the normal drive and the comb-tooth drive can be implemented.

This display driver may further comprise:

a shift direction setting register in which shift directions of the first and second bidirectional shift registers are set, wherein shift directions of the first and second bidirectional shift registers specified by the first and second shift direction control signals corresponding to the content of the shift direction setting register may be opposite when the comb-tooth drive mode is set in the drive mode setting register.

Shift directions of the first and second bidirectional shift registers are changed in the comb-tooth drive mode corresponding to the content of the shift direction setting register. This enables to provide a display driver which can change the orientation of an image to be displayed to an electro-optical device having comb-tooth distributed data lines.

In this display driver, the first shift start signal switch circuit may output a shift output in a final stage of the second bidirectional shift register as the first opposite directional shift start signal when the normal drive mode is set in the drive mode setting register, or output the shift start signal as the first opposite directional shift start signal when the comb-tooth drive mode is set in the drive mode setting register, the shift output having been shifted in the second shift direction in the second bidirectional register; and the second shift start signal switch circuit may output a shift output in a final stage of the first bidirectional shift register as the second opposite directional shift start signal when the normal drive mode is set in the drive mode setting register, or output the shift start signal as the second opposite directional shift start signal when the comb-tooth drive mode is set in the drive mode setting register, the shift output having been shifted in the first shift direction in the first bidirectional shift register.

By the first and second shift start signal switch circuits, the first and second bidirectional shift registers have the same shift direction in the normal drive mode and have opposite shift directions in the comb-tooth drive mode. This enables to provide a display driver in which both the normal drive and the comb-tooth drive can be implemented with a simple structure.

In this display driver, the data line driver circuit may drive part of the data lines from a first side of the electro-optical device based on the data held in the flip-flops of the first data latch, and drive part of the data lines from a second side of the electro-optical device facing the first side based on the data held in the flip-flops of the second data latch.

By driving part of the data lines from the first side based on the data held in the flip-flops of the first data latch, and driving part of the data lines from the second side of the electro-optical device which faces the first side based on the data held in the flip-flops of the second data latch, the distribution area (or the mounting area) for the comb-tooth distributed electro-optical device can be reduced.

This display driver may further comprise a shift clock signal generation circuit which generates the first and second shift clock signals based on a reference clock signal in the comb-tooth drive mode, wherein a shift operation period of the first and second shift registers may include a period in which phases of the first and second shift clock signals are reversed.

In this display driver, the shift clock signal generation circuit may generate the second shift clock signal by dividing frequency of the reference clock signal, and generate the first shift clock signal; and the first shift clock signal may have a pulse in a first stage capture period in which the first bidirectional shift register captures the first opposite directional shift start signal and the first shift clock signal may also have a phase which is the reverse of a phase of the second shift clock signal in a data capture period after the first stage capture period.

This enables to simplify the generation of the first and second shift clock signals. Therefore, configuration and control of the display driver can be simplified.

In this display driver, the data lines may extend from a first side of the electro-optical device to a second side facing the first side; and the direction in which the data lines extend may be the same as either the first shift direction or the second shift direction.

In this display driver, when the scanning lines extend along a long side of the electro-optical device and the data lines extend along a short side of the electro-optical device, the display driver may be disposed along the short side.

The mounting area for the comb-tooth distributed electro-optical device can be reduced as the number of data lines is increased.

According to another embodiment of the present invention, there is provided an electro-optical device comprising:

a plurality of scanning lines;

a plurality of data lines alternately arranged inwardly from opposite sides of the electro-optical device in the shape of comb teeth;

a plurality of switching elements respectively connected to the scanning lines and the data lines;

a plurality of pixel electrodes respectively connected to the switching elements;

the display driver which drives the data lines as defined in claim 1; and a scanning driver which scans the scanning lines.

According to a further embodiment of the present invention, there is provided an electro-optical device comprising:

a display panel which includes first and second sides facing each other, a plurality of scanning lines, a plurality of data lines alternately arranged inwardly from the first and second sides in the shape of comb teeth, a plurality of switching elements respectively connected to the scanning lines and the data lines, and a plurality of pixel electrodes respectively connected to the switching elements;

the display driver which drives the data lines as defined in claim 1; and a scanning driver which scans the scanning lines.

This enables to provide an electro-optical device which has a reduced mounting area and can be readily mounted on electronic instruments.

What is claimed is:

1. A display driver which drives a plurality of data lines of an electro-optical device, the electro-optical device having a plurality of scanning lines, the data lines which are alternately arranged inwardly from opposite sides of the electro-optical device in the shape of comb teeth, a plurality of switching elements respectively connected to the scanning lines and the data lines, and a plurality of pixel electrodes respectively connected to the switching elements, the display driver comprising:

a grayscale bus to which grayscale data is supplied corresponding to an arrangement order of the data lines;

a first bidirectional shift register which shifts a shift start signal in a first shift direction and shifts a first opposite directional shift start signal in a second shift direction which is opposite to the first shift direction, based on a first shift clock signal, and outputs a shift output shifted in one of the first and second shift directions specified by a first shift direction control signal;

a second bidirectional shift register which shifts the shift start signal in the second shift direction and shifts a second opposite directional shift start signal in the first shift direction, based on a second shift clock signal, and outputs a shift output shifted in one of the first and second shift directions specified by a second shift direction control signal;

a drive mode setting register in which one of a normal drive mode and a comb-tooth drive mode is set;

a first shift start signal switch circuit which outputs the shift start signal or a shift output in a final stage of the second bidirectional shift register as the first opposite directional shift start signal, corresponding to the content of the drive mode setting register, the shift output having been shifted in the second shift direction in the second bidirectional shift register;

a second shift start signal switch circuit which outputs the shift start signal or a shift output in a final stage of the first bidirectional shift register as the second opposite directional shift start signal, corresponding to the content of the drive mode setting register, the shift output having been shifted in the first shift direction in the first bidirectional shift register;

a first data latch which has a plurality of flip-flops each of which holds the grayscale data corresponding to one of the data lines based on a shift output in each stage of the first bidirectional shift register;

a second data latch which has a plurality of flip-flops each of which holds the grayscale data corresponding to one of the data lines based on a shift output in each stage of the second bidirectional shift register; and a data line driver circuit in which a plurality of data output sections are arranged corresponding to the arrangement order of the data lines, each of the data output sections driving one of the data lines based on the grayscale data held in one of the flip-flops of the first or second data latch.

2. The display driver as defined in claim 1, further comprising:

a shift direction control circuit which outputs the first and second shift direction control signals based on the content of the drive mode setting register, wherein:

shift directions of the first and second bidirectional shift registers specified by the first and second shift direction control signals are the same when the normal drive mode is set in the drive mode setting register; and shift directions of the first and second bidirectional shift registers specified by the first and second shift direction control signals are opposite when the comb-tooth drive mode is set in the drive mode setting register.

3. The display driver as defined in claim 2, further comprising:

a shift direction setting register in which shift directions of the first and second bidirectional shift registers are set, wherein shift directions of the first and second bidirectional shift registers specified by the first and second shift direction control signals corresponding to the content of the shift direction setting register are opposite when the comb-tooth drive mode is set in the drive mode setting register.

4. The display driver as defined in claim 3, wherein the data line driver circuit drives part of the data lines from a first side of the electro-optical device based on the data held in the flip-flops of the first data latch, and drives part of the data lines from a second side of the electro-optical device facing the first side based on the data held in the flip-flops of the second data latch.

5. The display driver as defined in claim 3, further comprising:

a shift clock signal generation circuit which generates the first and second shift clock signals based on a reference clock signal in the comb-tooth drive mode, wherein a shift operation period of the first and second shift registers includes a period in which phases of the first and second shift clock signals are reversed.

6. The display driver as defined in claim 5, wherein:

the shift clock signal generation circuit generates the second shift clock signal by dividing frequency of the reference clock signal, and generates the first shift clock signal; and the first shift clock signal has a pulse in a first stage capture period in which the first bidirectional shift register captures the first opposite directional shift start signal and the first shift clock signal also has a phase which is the reverse of a phase of the second shift clock signal in a data capture period after the first stage capture period.

7. The display driver as defined in claim 2, wherein:

the first shift start signal switch circuit outputs a shift output in a final stage of the second bidirectional shift register as the first opposite directional shift start signal when the normal drive mode is set in the drive mode setting register, or outputs the shift start signal as the first opposite directional shift start signal when the comb-tooth drive mode is set in the drive mode setting register, the shift output having been shifted in the second shift direction in the second bidirectional register; and the second shift start signal switch circuit outputs a shift output in a final stage of the first bidirectional shift register as the second opposite directional shift start signal when the normal drive mode is set in the drive mode setting register, or outputs the shift start signal as the second opposite directional shift start signal when the comb-tooth drive mode is set in the drive mode setting register, the shift output having been shifted in the first shift direction in the first bidirectional shift register.

8. The display driver as defined in claim 7,
wherein the data line driver circuit drives part of the data lines from a first side of the electro-optical device based on the data held in the flip-flops of the first data latch, and drives part of the data lines from a second side of the electro-optical device facing the first side based on the data held in the flip-flops of the second data latch.

9. The display driver as defined in claim 3, wherein:
the first shift start signal switch circuit outputs a shift output in a final stage of the second bidirectional shift register as the first opposite directional shift start signal when the normal drive mode is set in the drive mode setting register, or outputs the shift start signal as the first opposite directional shift start signal when the comb-tooth drive mode is set in the drive mode setting register, the shift output having been shifted in the second shift direction in the second bidirectional register; and
the second shift start signal switch circuit outputs a shift output in a final stage of the first bidirectional shift register as the second opposite directional shift start signal when the normal drive mode is set in the drive mode setting register, or outputs the shift start signal as the second opposite directional shift start signal when the comb-tooth drive mode is set in the drive mode setting register, the shift output having been shifted in the first shift direction in the first bidirectional shift register.

10. The display driver as defined in claim 9,
wherein the data line driver circuit drives part of the data lines from a first side of the electro-optical device based on the data held in the flip-flops of the first data latch, and drives part of the data lines from a second side of the electro-optical device facing the first side based on the data held in the flip-flops of the second data latch.

11. The display driver as defined in claim 2,
wherein the data line driver circuit drives part of the data lines from a first side of the electro-optical device based on the data held in the flip-flops of the first data latch, and drives part of the data lines from a second side of the electro-optical device facing the first side based on the data held in the flip-flops of the second data latch.

12. The display driver as defined in claim 2, further comprising:
a shift clock signal generation circuit which generates the first and second shift clock signals based on a reference clock signal in the comb-tooth drive mode,
wherein a shift operation period of the first and second shift registers includes a period in which phases of the first and second shift clock signals are reversed.

13. The display driver as defined in claim 12, wherein:
the shift clock signal generation circuit generates the second shift clock signal by dividing frequency of the reference clock signal, and generates the first shift clock signal; and
the first shift clock signal has a pulse in a first stage capture period in which the first bidirectional shift register captures the first opposite directional shift start signal and the first shift clock signal also has a phase which is the reverse of a phase of the second shift clock signal in a data capture period after the first stage capture period.

14. The display driver as defined in claim 1, wherein:
the first shift start signal switch circuit outputs a shift output in a final stage of the second bidirectional shift register as the first opposite directional shift start signal when the normal drive mode is set in the drive mode setting register, or outputs the shift start signal as the first opposite directional shift start signal when the comb-tooth drive mode is set in the drive mode setting register, the shift output having been shifted in the second shift direction in the second bidirectional register; and
the second shift start signal switch circuit outputs a shift output in a final stage of the first bidirectional shift register as the second opposite directional shift start signal when the normal drive mode is set in the drive mode setting register, or outputs the shift start signal as the second opposite directional shift start signal when the comb-tooth drive mode is set in the drive mode setting register, the shift output having been shifted in the first shift direction in the first bidirectional shift register.

15. The display driver as defined in claim 14,
wherein the data line driver circuit drives part of the data lines from a first side of the electro-optical device based on the data held in the flip-flops of the first data latch, and drives part of the data lines from a second side of the electro-optical device facing the first side based on the data held in the flip-flops of the second data latch.

16. The display driver as defined in claim 1,
wherein the data line driver circuit drives part of the data lines from a first side of the electro-optical device based on the data held in the flip-flops of the first data latch, and drives part of the data lines from a second side of the electro-optical device facing the first side based on the data held in the flip-flops of the second data latch.

17. The display driver as defined in claim 1, further comprising:
a shift clock signal generation circuit which generates the first and second shift clock signals based on a reference clock signal in the comb-tooth drive mode,
wherein a shift operation period of the first and second shift registers includes a period in which phases of the first and second shift clock signals are reversed.

18. The display driver as defined in claim 17, wherein:
the shift clock signal generation circuit generates the second shift clock signal by dividing frequency of the reference clock signal, and generates the first shift clock signal; and
the first shift clock signal has a pulse in a first stage capture period in which the first bidirectional shift register captures the first opposite directional shift start signal and the first shift clock signal also has a phase which is the reverse of a phase of the second shift clock signal in a data capture period after the first stage capture period.

19. The display driver as defined in claim 1, wherein:
the data lines extend from a first side of the electro-optical device to a second side facing the first side; and
the direction in which the data lines extend is the same as either the first shift direction or the second shift direction.

20. The display driver as defined in claim 1,
wherein, when the scanning lines extend along a long side of the electro-optical device and the data lines extend along a short side of the electro-optical device, the display driver is disposed along the short side.

21. An electro-optical device comprising:
a plurality of scanning lines;
a plurality of data lines alternately arranged inwardly from opposite sides of the electro-optical device in the shape of comb teeth;

a plurality of switching elements respectively connected to the scanning lines and the data lines;

a plurality of pixel electrodes respectively connected to the switching elements;

the display driver which drives the data lines as defined in claim 1; and a scanning driver which scans the scanning lines.

22. An electro-optical device comprising:

a display panel which includes first and second sides facing each other, a plurality of scanning lines, a plurality of data lines alternately arranged inwardly from the first and second sides in the shape of comb teeth, a plurality of switching elements respectively connected to the scanning lines and the data lines, and a plurality of pixel electrodes respectively connected to the switching elements;

the display driver which drives the data lines as defined in claim 1; and a scanning driver which scans the scanning lines.

* * * * *